United States Patent
Kumar et al.

(10) Patent No.: US 11,924,799 B2
(45) Date of Patent: Mar. 5, 2024

(54) ENHANCEMENTS IN POSITION DETERMINATION IN 5G CELLULAR COMMUNICATIONS

(71) Applicant: QUALCOMM Incorporated, San Diego, CA (US)

(72) Inventors: Akash Kumar, Hyderabad (IN); Amit Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/143,034

(22) Filed: Jan. 6, 2021

(65) Prior Publication Data
US 2022/0217671 A1    Jul. 7, 2022

(51) Int. Cl.
*H04W 16/10* (2009.01)
*H04W 72/54* (2023.01)
*H04W 64/00* (2009.01)

(52) U.S. Cl.
CPC .................................. *H04W 64/00* (2013.01)

(58) Field of Classification Search
CPC ...... H04W 64/00; H04W 16/10; H04W 72/54
USPC ..... 455/67.11, 456.3, 425, 553.1, 422.1, 443
See application file for complete search history.

(56) References Cited

U.S. PATENT DOCUMENTS

| | | | |
|---|---|---|---|
| 11,272,546 B2 * | 3/2022 | Sun ................... | H04W 74/0833 |
| 2011/0039574 A1 | 2/2011 | Charbit et al. | |
| 2014/0342755 A1 * | 11/2014 | Youssef ............... | G01S 5/0236 455/456.2 |
| 2017/0026798 A1 * | 1/2017 | Prevatt .................. | H04W 4/023 |
| 2018/0035256 A1 * | 2/2018 | Prevatt ...................... | G01S 5/14 |
| 2019/0053013 A1 * | 2/2019 | Markhovsky ....... | H04L 43/0864 |
| 2019/0245663 A1 * | 8/2019 | Kim ...................... | H04L 5/0091 |
| 2019/0285722 A1 * | 9/2019 | Markhovsky ........... | G01S 1/042 |
| 2020/0182959 A1 * | 6/2020 | Markhovsky ............. | G01S 5/12 |
| 2022/0196780 A1 * | 6/2022 | Dwivedi ........... | H04W 72/0446 |

FOREIGN PATENT DOCUMENTS

EP    3644662 A1    4/2020

OTHER PUBLICATIONS

International Search Report and Written Opinion—PCT/US2021/056905—ISA/EPO—dated Feb. 24, 2022.

* cited by examiner

*Primary Examiner* — Joseph Arevalo
(74) *Attorney, Agent, or Firm* — Thien T. Nguyen

(57) ABSTRACT

The location of a user equipment may be determined by having the user equipment use a radio carrier and/or a bandwidth part having the highest sub-carrier spacing available to the user equipment. A user equipment may communicate through a plurality of radio carriers, determine a first radio carrier or bandwidth part having a highest sub-carrier spacing, determine a timing advance value associated with the first radio carrier or bandwidth part, and transmit to a location server, the timing advance value.

30 Claims, 13 Drawing Sheets

ENHANCEMENTS IN POSITION DETERMINATION IN 5G CELLULAR COMMUNICATIONS

BACKGROUND

Field

Subject matter disclosed herein relates to positioning of user equipment and more particularly to determining the position of the user equipment using timing advance values associated with different radio carriers and bandwidth parts.

Information

The location of a user equipment (UE), such as a cellular telephone, may be useful or essential to a number of applications including emergency calls, navigation, direction finding, asset tracking and Internet service. The location of a UE may be estimated based on information gathered from various systems. In a cellular network implemented according to 4G (also referred to as Fourth Generation) Long Term Evolution (LTE) radio access or 5G (also referred to as Fifth Generation) "New Radio" (NR), for example, a base station may send assistance data is sent to the UE to assist in acquiring and measuring signals, and in some implementations, to compute a location estimate from the measurements. The UE may compute an estimate of its own location using various positioning methods or may send the positioning measurements to a network entity, e.g., location server, which may compute the UE location based on the positioning measurements. Improvements in efficiency and/or accuracy are desirable.

SUMMARY

The location of a user equipment may be determined based on timing advance values. During a positioning session, the user equipment may change to a radio carrier or bandwidth part having a highest sub-carrier spacing. Radio carriers or bandwidth parts with higher sub-carrier spacings are associated with the smallest (e.g., highest resolution) timing advance values.

In one implementation, a method for supporting positioning of a user equipment (UE) in a wireless network performed by the UE may include communicating, by the UE, with one or more base stations using a plurality of radio carriers, each of the plurality of radio carriers being associated with a different base station, and receiving an indication to obtain a positioning measurement that includes timing advance information. The method further includes determining a first radio carrier having a highest sub-carrier spacing in the plurality of radio carriers, determining a first timing advance value and a first carrier identifier (ID) associated with the first radio carrier, and transmitting, to a location server, a positioning measurement comprising the first timing advance value and the first carrier ID of the first radio carrier.

In another implementation, a user equipment may include a memory, a wireless transceiver configured to communicate through one or more wireless networks, and one or more processors operably coupled to the wireless transceiver and the memory. The one or more processors may be configured to communicate with one or more base stations using a plurality of radio carriers, each of the plurality of radio carriers being associated with a different base station, receive an indication to obtain a positioning measurement that includes timing advance information, determine a first radio carrier having a highest sub-carrier spacing in the plurality of radio carriers, determine a first timing advance value and a first carrier identifier (ID) associated with the first radio carrier, and transmit, to a location server, a positioning measurement comprising the first timing advance value and the first carrier ID of the first radio carrier.

In another implementation, a user equipment (UE) may include: means for communicating with one or more base stations using a plurality of radio carriers, each of the plurality of radio carriers being associated with a different base station, means for receiving an indication to obtain a positioning measurement that includes timing advance information, means for determining a first radio carrier having a highest sub-carrier spacing in the plurality of radio carriers, means for determining a first timing advance value and a first carrier identifier (ID) associated with the first radio carrier, and means for transmitting, to a location server, a positioning measurement comprising the first timing advance value and the first carrier ID of the first radio carrier.

In another implementation, A non-transitory computer readable storage medium including program code stored thereon, the program code is operable to configure at least one processor in a mobile device for supporting positioning of the mobile device in a wireless network, comprising program code to communicate with one or more base stations using a plurality of radio carriers, each of the plurality of radio carriers being associated with a different base station, program code to receive an indication to obtain a positioning measurement that includes timing advance information, program code to determine a first radio carrier having a highest sub-carrier spacing in the plurality of radio carriers, program code to determine a first timing advance value and a first carrier identifier (ID) associated with the first radio carrier, and program code to transmit, to a location server, a positioning measurement comprising the first timing advance value and the first carrier ID of the first radio carrier.

In another implementation, a method for supporting positioning of a user equipment (UE) in a wireless network performed by the UE may include receiving a positioning session message from a location server to obtain a positioning measurement that includes a timing advance value, determining sub-carrier spacing deployed in a plurality of bandwidth parts available to the UE, and sending a message to a serving base station requesting the serving base station to switch the UE to a first bandwidth part with a highest sub-carrier spacing in the plurality of bandwidth parts during a positioning session.

In another implementation, a user equipment (UE) may include a memory, a wireless transceiver configured to communicate through one or more wireless networks, and one or more processors coupled to the wireless transceiver and the memory. The one or more processors may be configured to receive a positioning session message from a location server to obtain a timing advance positioning measurement that includes a timing advance value, determine sub-carrier spacing deployed in a plurality of bandwidth parts available to the UE, and send a message to a serving base station requesting the serving base station to switch the UE to a first bandwidth part with a highest sub-carrier spacing in the plurality of bandwidth parts during the positioning session.

In another implementation, a user equipment (UE) may include means for receiving a positioning session message from a location server to obtain a positioning measurement that includes a timing advance value, means for determining sub-carrier spacing deployed in a plurality of bandwidth parts available to the UE, and means for sending a message to a serving base station requesting the serving base station to switch the UE to a first bandwidth part with a highest sub-carrier spacing in the plurality of bandwidth parts during a positioning session.

In another implementation, a non-transitory computer readable storage medium including program code stored thereon, the program code is operable to configure at least one processor in a user equipment (UE) for supporting positioning of the UE in a wireless network, comprising program code to receive a positioning session message from a location server to obtain a positioning measurement that includes a timing advance value, program code to determine sub-carrier spacing deployed in a plurality of bandwidth parts available to the UE, and program code to send a message to a serving base station requesting the serving base station to switch the UE to a first bandwidth part with a highest sub-carrier spacing in the plurality of bandwidth parts during a positioning session.

In another implementation, a method for supporting positioning of a user equipment (UE) in a wireless network performed by a location server, the method comprising determining sub-carrier spacing deployed in a plurality of bandwidth parts available to the UE, sending a message to a serving base station of the UE requesting the serving base station to switch the UE to a first bandwidth part with a highest sub-carrier spacing in the plurality of bandwidth parts, and receiving a positioning measurement that includes a first timing advance value, wherein a location of the UE is determined based on the first timing advance value.

In another implementation, a location server may include a memory, a communication interface configured to communicate through a network, and one or more processors coupled to the communication interface and the memory, the one or more processors configured to determine sub-carrier spacing deployed in a plurality of bandwidth parts available to a UE, send a message to a serving base station requesting the serving base station to switch the UE to a first bandwidth part with a highest sub-carrier spacing in the plurality of bandwidth parts, and receive a positioning measurement that includes a first timing advance value, wherein a location of the UE is determined based on the first timing advance value.

In another implementation, a location server may include means for determining sub-carrier spacing deployed in a plurality of bandwidth parts available to a user equipment, means for sending a message to a serving base station requesting the serving base station to switch the UE to a first bandwidth part with a highest sub-carrier spacing in the plurality of bandwidth parts, and means for receiving a positioning measurement that includes a first timing advance value, wherein a location of the UE is determined based on the first timing advance value.

In another implementation, a non-transitory computer readable storage medium including program code stored thereon, the program code is operable to configure at least one processor in a location server for supporting positioning of a user equipment (UE) in a wireless network, comprising program code to determine sub-carrier spacing deployed in a plurality of bandwidth parts available to the UE, program code to send a message to a serving base station of the UE requesting the serving base station to switch the UE to a first bandwidth part with a highest sub-carrier spacing in the plurality of bandwidth parts, and program code to receive a positioning measurement that includes a first timing advance value, wherein a location of the UE is determined based on the first timing advance value.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
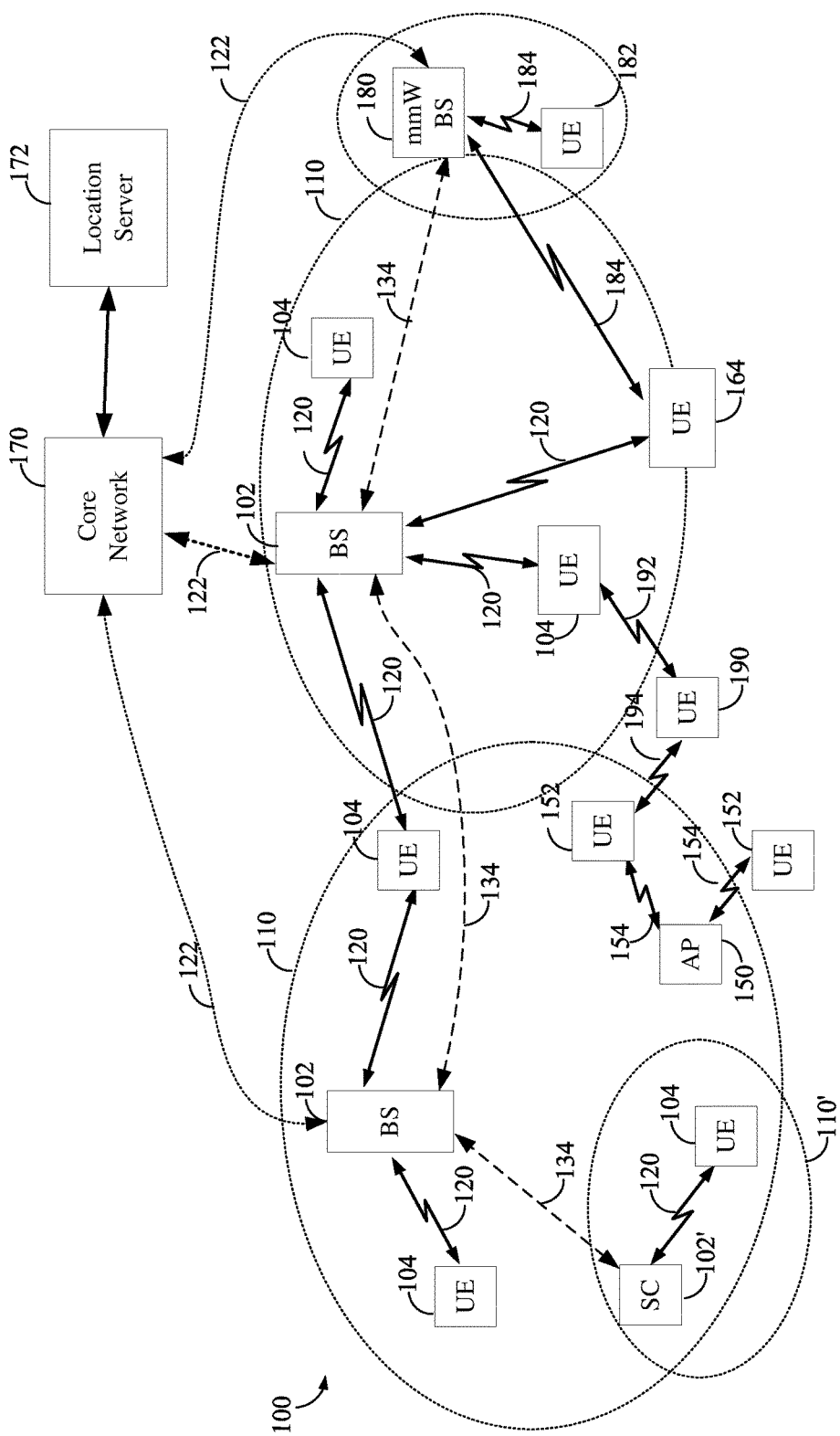
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission point or to multiple physical transmission points that may or may not be co-located. For example, where the term "base station" refers to a single physical transmission point, the physical transmission point may be an antenna of the base station corresponding to a cell of the base station. Where the term "base station" refers to multiple co-located physical transmission points, the physical transmission points may be an array of antennas (e.g., as in a multiple-input multiple-output (MIMO) system or where the base station employs beamforming) of the base station. Where the term "base station" refers to multiple non-co-located physical transmission points, the physical transmission points may be a distributed antenna system (DAS) (a network of spatially separated antennas connected to a common source via a transport medium) or a remote radio head (RRH) (a remote base station connected to a serving base station). Alternatively, the non-co-located physical transmission points may be the serving base station receiving the measurement report from the UE and a neighbor base station whose reference radio frequency (RF) signals the UE is measuring.

To support positioning of a UE, two broad classes of location solution have been defined: control plane and user plane. With control plane (CP) location, signaling related to positioning and support of positioning may be carried over existing network (and UE) interfaces and using existing protocols dedicated to the transfer of signaling. With user plane (UP) location, signaling related to positioning and support of positioning may be carried as part of other data using such protocols as the Internet Protocol (IP), Transmission Control Protocol (TCP) and User Datagram Protocol (UDP).

The Third Generation Partnership Project (3GPP) has defined control plane location solutions for UEs that use radio access according to Global System for Mobile communications GSM (2G), Universal Mobile Telecommunications System (UMTS) (3G), LTE (4G) and New Radio (NR) for Fifth Generation (5G). These solutions are defined in 3GPP Technical Specifications (TSs) 23.271 and 23.273 (common parts), 43.059 (GSM access), 25.305 (UMTS access), 36.305 (LTE access) and 38.305 (NR access). The Open Mobile Alliance (OMA) has similarly defined a UP location solution known as Secure User Plane Location (SUPL) which can be used to locate a UE accessing any of a number of radio interfaces that support IP packet access such as General Packet Radio Service (GPRS) with GSM, GPRS with UMTS, or IP access with LTE or NR.

Both CP and UP location solutions may employ a location server to support positioning. The location server may be part of or accessible from a serving network or a home network for a UE or may simply be accessible over the Internet or over a local Intranet. If positioning of a UE is needed, a location server may instigate a session (e.g. a location session or a SUPL session) with the UE and coordinate location measurements by the UE and determination of an estimated location of the UE. During a location session, a location server may request positioning capabilities of the UE (or the UE may provide them without a request), may provide assistance data to the UE (e.g. if requested by the UE or in the absence of a request) and may request a location estimate or location measurements from a UE for various positioning techniques, e.g. for the Global Navigation Satellite System (GNSS), Time Difference of Arrival (TDOA), Angle of Departure (AoD), Round Trip Time (RTT) or multi cell RTT (Multi-RTT), Enhanced Cell ID (ECID), or other position methods. Assistance data may be used by a UE to acquire and measure GNSS and/or reference signals (e.g. by providing expected characteristics of these signals such as frequency, expected time of arrival, signal coding, signal Doppler).

In a UE based mode of operation, assistance data may also or instead be used by a UE to help determine a location estimate from the resulting location measurements (e.g., if the assistance data provides satellite ephemeris data in the case of GNSS positioning or base station locations and other base station characteristics such as PRS timing in the case of terrestrial positioning using, e.g., TDOA, AoD, Multi-RTT, etc.).

In a UE assisted mode of operation, a UE may return location measurements to a location server which may determine an estimated location of the UE based on these measurements and possibly based also on other known or configured data (e.g. satellite ephemeris data for GNSS location or base station characteristics including base station locations and possibly PRS timing in the case of terrestrial positioning using, e.g., TDOA, AoD, Multi-RTT, etc.).

In another standalone mode of operation, a UE may make location related measurements without any positioning assistance data from a location server and may further compute a location or a change in location without any positioning assistance data from a location server. Position methods that may be used in a standalone mode include GPS and GNSS (e.g. if a UE obtains satellite orbital data from data broadcast by GPS and GNSS satellites themselves) as well as sensors.

In the case of 3GPP CP location, a location server may be an enhanced serving mobile location center (E-SMLC) in the case of LTE access, a standalone SMLC (SAS) in the case of UMTS access, a serving mobile location center (SMLC) in the case of GSM access, or a Location Management Function (LMF) in the case of 5G NR access. In the case of OMA SUPL location, a location server may be a SUPL Location Platform (SLP) which may act as any of: (i) a home SLP (H-SLP) if in or associated with the home network of a UE or if providing a permanent subscription to a UE for location services; (ii) a discovered SLP (D-SLP) if in or associated with some other (non-home) network or if not associated with any network; (iii) an Emergency SLP (E-SLP) if supporting location for an emergency call instigated by the UE; or (iv) a visited SLP (V-SLP) if in or associated with a serving network or a current local area for a UE.

During a location session, a location server and UE may exchange messages defined according to some positioning protocol in order to coordinate the determination of an estimated location. Possible positioning protocols may include, for example, the LTE Positioning Protocol (LPP) defined by 3GPP in 3GPP TS 36.355 and the LPP Extensions (LPPe) protocol defined by OMA in OMA TSs OMA-TS-LPPe-V1_0, OMA-TS-LPPe-V1_1 and OMA-TS-LPPe-V2_0. The LPP and LPPe protocols may be used in combination where an LPP message contains one embedded LPPe message. The combined LPP and LPPe protocols may be referred to as LPP/LPPe. LPP and LPP/LPPe may be used to help support the 3GPP control plane solution for LTE or NR access, in which case LPP or LPP/LPPe messages are exchanged between a UE and E-SMLC or between a UE and LMF. LPP or LPPe messages may be exchanged between a UE and E-SMLC via a serving Mobility Management Entity (MME) and a serving eNodeB for the UE. LPP or LPPe messages may also be exchanged between a UE and LMF via a serving Access and Mobility Management Function (AMF) and a serving NR Node B (gNB) for the UE. LPP and LPP/LPPe may also be used to help support the OMA SUPL solution for many types of wireless access that support IP messaging (such as LTE, NR and WiFi), where LPP or LPP/LPPe messages are exchanged between a SUPL Enabled Terminal (SET), which is the term used for a UE with SUPL, and an SLP, and may be transported within SUPL messages such as a SUPL POS or SUPL POS INIT message A location server and a base station (e.g. an eNodeB for LTE access) may exchange messages to enable the location server to (i) obtain position measurements for a particular UE from the base station, or (ii) obtain location information from the base station not related to a particular UE such as the location coordinates of an antenna for the base station, the cells (e.g. cell identities) supported by the base station, cell timing for the base station and/or parameters for signals transmitted by the base station such as PRS signals. In the case of LTE access, the LPP A (LPPa) protocol may be used to transfer such messages between a base station that is an eNodeB and a location server that is an E-SMLC. In the case of NR access, the NRPPA protocol may be used to transfer such messages between a base station that is a gNodeB and a location server that is an LMF. It is noted that the terms "parameter" and "information element" (IE) are synonymous and are used interchangeably herein.

During positioning using signaling in LTE and 5G NR, a UE typically acquires a dedicated positioning signals transmitted by base stations, e.g., referred to as positioning reference signals (PRS), which are used to generate the desired measurements for the supported positioning technique. Positioning Reference Signals (PRS) are defined for 5G NR positioning to enable UEs to detect and measure more neighbor base stations or Transmission and Reception Points (TRPs). Several configurations are supported to enable a variety of deployments (indoor, outdoor, sub-6, mmW). To support PRS beam operation, beam sweeping is additionally supported for PRS. Table 1 below illustrates 3GPP release numbers (e.g., Rel.16 or Rel.15) that define particular reference signals for various UE measurements and the accompanying positioning techniques.

TABLE 1

| DL/UL Reference Signals | UE Measurements | To facilitate support of the following positioning techniques |
| --- | --- | --- |
| Rel.16 DL PRS | DL RSTD | DL-TDOA |
| Rel.16 DL PRS | DL PRS RSRP | DL-TDOA, DL-AoD, Multi-RTT |
| Rel.16 DL PRS/Rel.16 SRS for positioning | UE Rx-Tx time difference, | Multi-RTT |
| Rel. 15 SSB/CSI-RS for RRM | SS-RSRP(RSRP for RRM), SS-RSRQ (for RRM), CSI-RSRP (for RRM), CSI-RSRQ (for RRM), Timing Advance (TA) | ECID |

The location of a UE may be determined via ECID positioning. ECID positioning techniques may use timing advance values to locate a UE with respect to a particular base station (e.g., an eNB and/or a gNB). UEs may communicate with a base station through one or more radio carriers, where each radio carrier has an associated sub-carrier spacing. Radio carriers may use a contiguous set of physical resource blocks, referred to as bandwidth parts (BWPs), that are selected from a contiguous subset of the common resource blocks, and each BWP may be associated with a different sub-carrier spacing. In turn, the radio carriers or BWPs with different sub-carrier spacings may be associated with different resolutions of timing advance values. For example, higher sub-carrier spacings may be associated with higher resolution (e.g., more accurate) timing advance values than lower sub-carrier spacings. Accordingly, when timing advance values are used for positioning, in timing advance based positioning techniques, such as ECID, the position determination for the UE has a higher resolution (e.g., more accurate) if the timing advance value is derived using a carrier or BWP with a higher sub-carrier spacing compared to a carrier or BWP with relatively lower sub-carrier spacing. In some implementations discuss herein, the operation of the UE may be moved to a radio carrier or BWP having the highest available sub-carrier spacing to improve the accuracy of a positioning session.

Particular implementations of the subject matter described in this disclosure can be implemented to realize one or more of the following potential advantages. By using radio carriers or BWPs that are associated with the most accurate timing advance values that are available, a more accurate position of the UE may be determined.

FIG. 1 illustrates an exemplary wireless communications system 100, according to various aspects of the disclosure. The wireless communications system 100 (which may also be referred to as a wireless wide area network (WWAN)) may include various base stations 102, sometimes referred to herein as TRPs 102, and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and to one or more location servers 172. Location server 172 is illustrated as connected to core network 170 for clarity, but it should be understood that location server 172 may be within the core network 170 or within a RAN, e.g., co-located with one or more base stations 102 (e.g., as a location server surrogate (LSS) or the like). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, multiple carriers are combined, either in the same or different bands, to increase the bandwidth available to increase the capacity of the link. The anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

If the UE 104/182 has dual connectivity (DC), the radio access node that provides the control plane connection to the core network in case of multi radio dual connectivity (MR-DC) is referred to as the master node, which may be a master eNB in EN-DC, a Master ng-eNB in NGEN-DC. A master cell group (MCG) is a group of serving cells associated with the master node, that includes the PCell and optionally one or more Scells. A secondary node is another radio access node, with no control plane connection to the core network, and that provides additional resources to the UE in case of MR-DC, which may be, e.g., an en-gNB in EN-DC or a Secondary ng-eNB (in NE-DC). A secondary cell group (SCG) is a group of serving cells associated with the secondary node, that includes the primary secondary cell (PSCell) and optionally one or more Scells. The PSCell is the cell that provides the initial access under the SCG.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
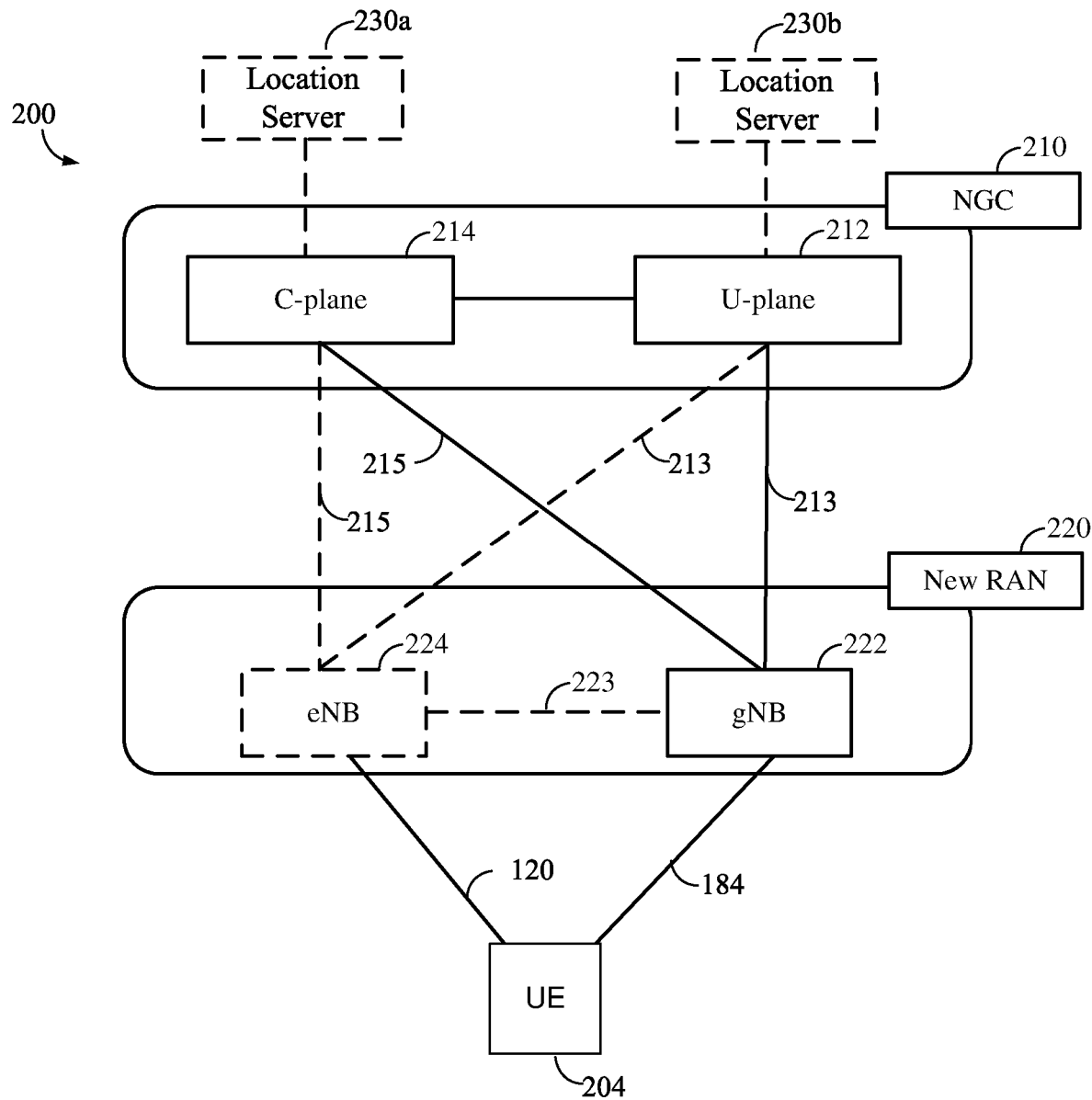
FIGS. 2A and 2B illustrate example wireless network structures, according to various aspects of the disclosure.

FIG. 2A illustrates an example wireless network structure 200, according to various aspects of the disclosure. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include one or more location servers 230a, 230b (sometimes collectively referred to as location server 230) (which may correspond to location server 172), which may be in communication with the control plane functions 214 and user plane functions 212, respectively, in the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network, e.g., in the New RAN 220.

Figure 2B:
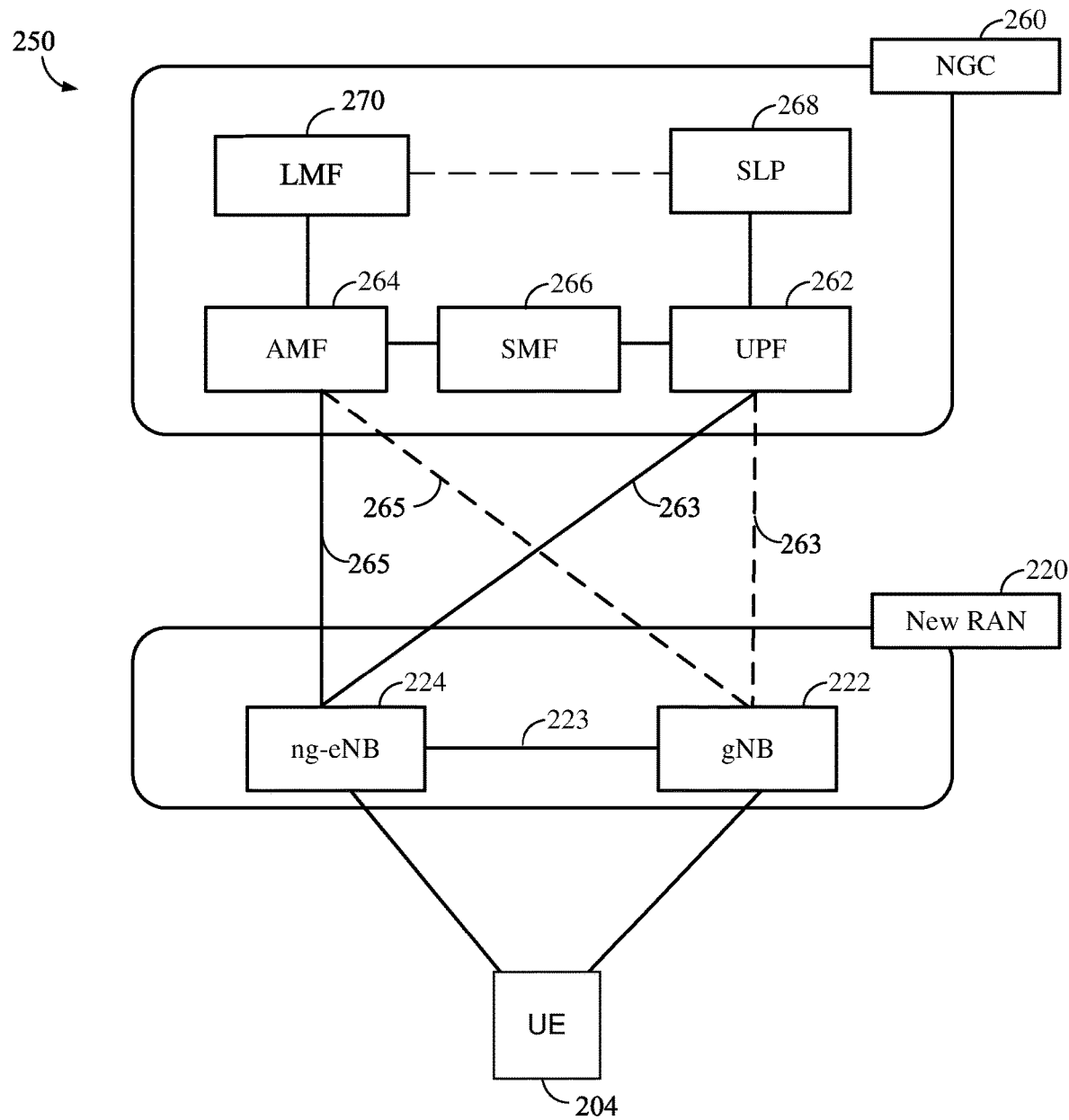

FIG. 2B illustrates another example wireless network structure 250, according to various aspects of the disclosure. For example, an NGC 260 (also referred to as a "5GC") can be viewed functionally as control plane functions, provided by an access and mobility management function (AMF) 264, user plane function (UPF) 262, a session management function (SMF) 266, SLP 268, and an LMF 270, which operate cooperatively to form the core network (i.e., NGC 260). User plane interface 263 and control plane interface 265 connect the ng-eNB 224 to the NGC 260 and specifically to UPF 262 and AMF 264, respectively. In an additional configuration, a gNB 222 may also be connected to the NGC 260 via control plane interface 265 to AMF 264 and user plane interface 263 to UPF 262. Further, eNB 224 may directly communicate with gNB 222 via the backhaul connection 223, with or without gNB direct connectivity to the NGC 260. In some configurations, the New RAN 220 may only have one or more gNBs 222, while other configurations include one or more of both ng-eNBs 224 and gNBs 222. Either gNB 222 or eNB 224 may communicate with UEs 204 (e.g., any of the UEs depicted in FIG. 1). The base stations of the New RAN 220 communicate with the AMF 264 over the N2 interface and the UPF 262 over the N3 interface.

The functions of the AMF include registration management, connection management, reachability management, mobility management, lawful interception, transport for session management (SM) messages between the UE 204 and the SMF 266, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270 (which may correspond to location server 172), as well as between the New RAN 220 and the LMF 270, evolved packet system (EPS) bearer identifier allocation for interworking with the EPS, and UE 204 mobility event notification. In addition, the AMF also supports functionalities for non-Third Generation Partnership Project (3GPP) access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 266 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
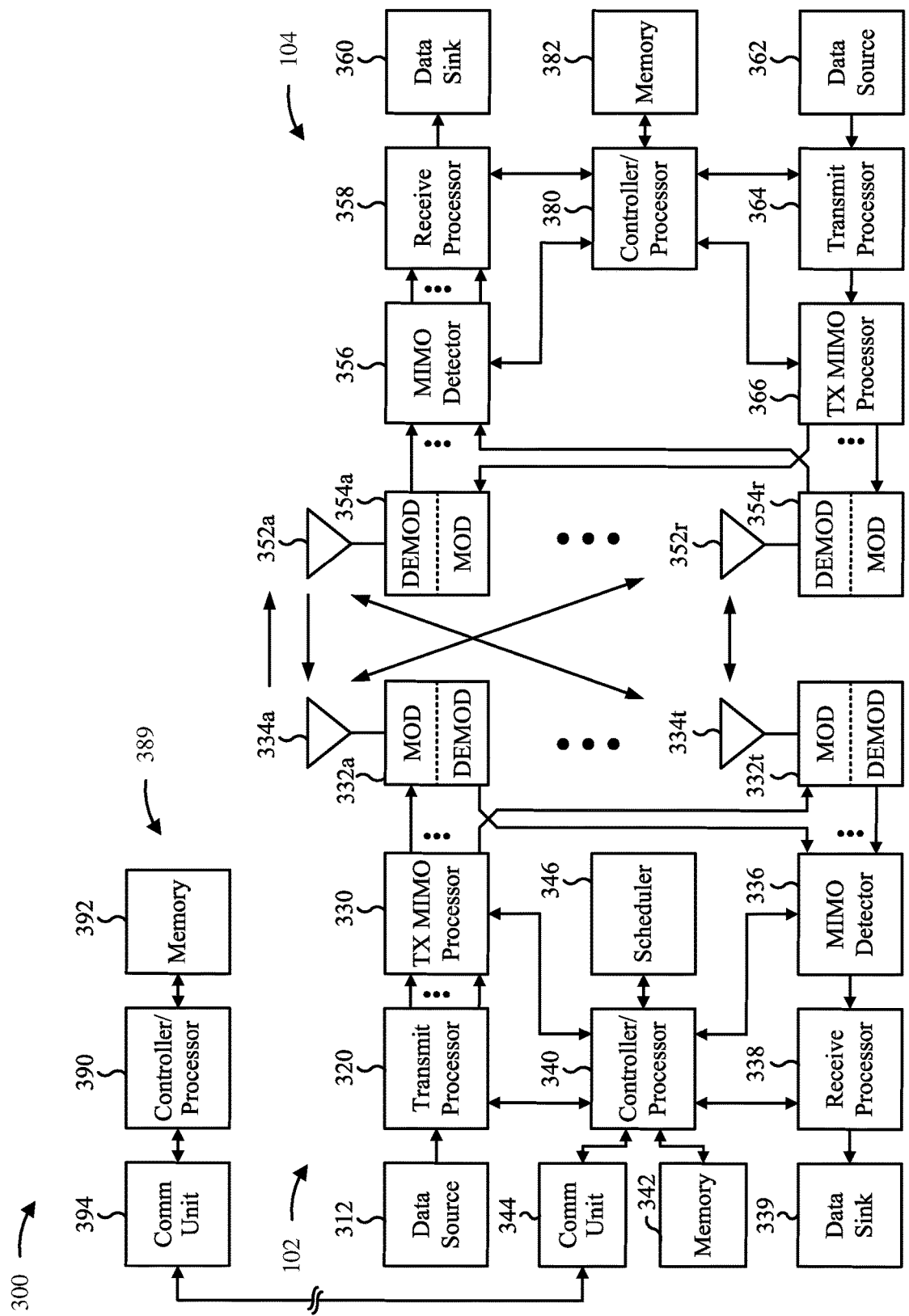
FIG. 3 shows a block diagram of a design of base station and UE, which may be one of the base stations and one of the UEs in FIG. 1.

FIG. 3 shows a block diagram of a design 300 of base station 102 and UE 104, which may be one of the base stations and one of the UEs in FIG. 1. Base station 102 may be equipped with T antennas 334a through 334t, and UE 104 may be equipped with R antennas 352a through 352r, where in general T≥1 and R≥1.

At base station 102, a transmit processor 320 may receive data from a data source 312 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 320 may also process system information (e.g., for semi-static resource partitioning information (SRPI) and/or the like) and control information (e.g., CQI requests, grants, upper layer signaling, and/or the like) and provide overhead symbols and control symbols. Transmit processor 320 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 330 may perform spatial processing (e.g., precoding) on the data symbols, the control symbols, the overhead symbols, and/or the reference symbols, if applicable, and may provide T output symbol streams to T modulators (MODs) 332a through 332t. Each modulator 332 may process a respective output symbol stream (e.g., for OFDM and/or the like) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively. According to various aspects described in more detail below, the synchronization signals can be generated with location encoding to convey additional information.

At UE 104, antennas 352a through 352r may receive the downlink signals from base station 102 and/or other base stations and may provide received signals to demodulators (DEMODs) 354a through 354r, respectively. Each demodulator 354 may condition (e.g., filter, amplify, down convert, and digitize) a received signal to obtain input samples. Each demodulator 354 may further process the input samples (e.g., for OFDM and/or the like) to obtain received symbols. A MIMO detector 356 may obtain received symbols from all R demodulators 354a through 354r, perform MIMO detection on the received symbols if applicable, and provide detected symbols. A receive processor 358 may process (e.g., demodulate and decode) the detected symbols, provide decoded data for UE 104 to a data sink 360, and provide decoded control information and system information to a controller/processor 380. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 364 may receive and process data from a data source 362 and control information (e.g., for reports comprising RSRP, RSSI, RSRQ, CQI, and/or the like) from controller/processor 380. Transmit processor 364 may also generate reference symbols for one or more reference signals. The symbols from transmit processor 364 may be precoded by a TX MIMO processor 366 if applicable, further processed by modulators 354a through 354r (e.g., for DFT-s-OFDM, CP-OFDM, and/or the like), and transmitted to base station 102. At base station 102, the uplink signals from UE 104 and other UEs may be received by antennas 334, processed by demodulators 332, detected by a MIMO detector 336 if applicable, and further processed by a receive processor 338 to obtain decoded data and control information sent by UE 104. Receive processor 338 may provide the decoded data to a data sink 339 and the decoded control information to controller/processor 340. Base station 102 may include communication unit 344 and communicate to network controller 389 via communication unit 344. Network controller 389 may include communication unit 394, controller/processor 390, and memory 392.

Controller/processor 340 of base station 102, controller/processor 380 of UE 104, controller 390 of network controller 389, which may be location server 172, and/or any other component(s) of FIG. 3 may perform one or more techniques associated broadcasting positioning assistance data in a differential manner, as described in more detail elsewhere herein. For example, controller/processor 340 of base station 102, controller 390 of network controller 389, controller/processor 380 of UE 104, and/or any other component(s) of FIG. 3 may perform or direct operations of, for example, process 1000, 1100, and 1200 of FIGS. 10, 11, and 12, and/or other processes as described herein. Memories 342, 382, and 392 may store data and program codes for base station 102, UE 104, and network controller 389, respectively. In some aspects, memory 342 and/or memory 382 and/or memory 392 may comprise a non-transitory computer-readable medium storing one or more instructions for wireless communication. For example, the one or more instructions, when executed by one or more processors of base station 102, network controller 389, and/or the UE 104 may perform or direct operations of, for example, process 1000, 1100, and 1200 of FIGS. 10, 11, and 12 and/or other processes as described herein. A scheduler 346 may schedule UEs for data transmission on the downlink and/or uplink.

As indicated above, FIG. 3 is provided as an example. Other examples may differ from what is described with regard to FIG. 3.

Downlink (DL), uplink (UL), and sidelink (SL) transmissions are organized into frames of a specified time duration, each consisting of ten subframes. There is one set of frames in the uplink and one set of frames in the downlink on a carrier. The UL transmissions by the UE 104 may be controlled using a timing advance value so that the UL frames are aligned with the DL frames at the serving base station.

Figure 4:
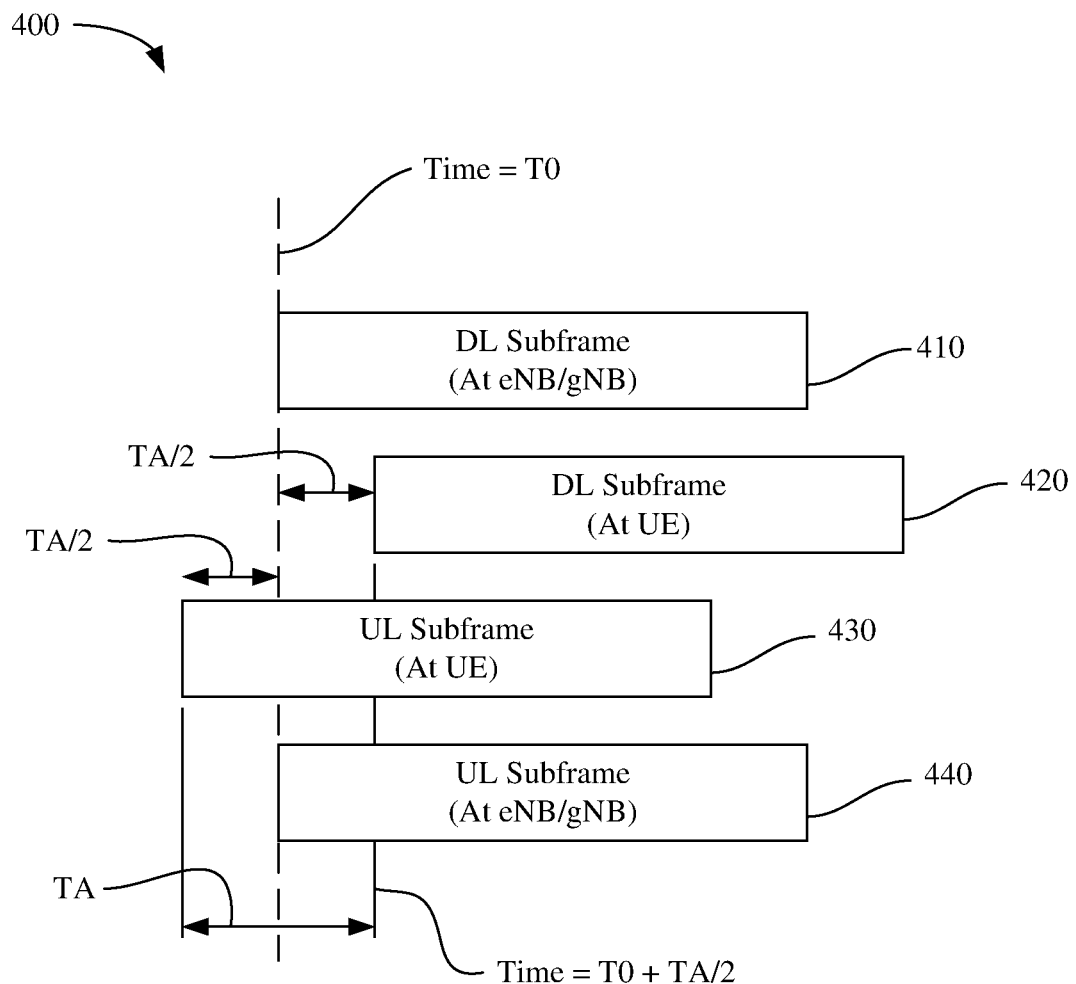
FIG. 4 shows a simplified diagram of UL and DL subframes between UE and base station.

FIG. 4 shows a simplified diagram of the timing alignment of UL and DL subframes 400 transmitted and received by UE 104 and base station 102. The timing of a UL subframe transmitted by the UE may be adjusted to be in alignment with the associated DL subframe using a timing advance value. As shown, at time T0, a DL subframe 410 may be transmitted by base station 102 (e.g., an eNB or a gNB) to the UE 104. The corresponding DL subframe 420 is received by the UE at a time after T0. The difference in time between transmission and reception is denoted as TA/2. This time difference may be due, at least in part, to propagation delays associated with a physical distance between the UE 104 and the base station 102. Based on reciprocal channel conditions, the UE adjusts (or advances) the transmit time of a UL subframe 430 by a similar amount of time (TA/2) such that UL subframe 440 is received by the base station 102 in alignment with the DL subframe 410.

The adjustment of the UL transmission is controlled by a timing advance value TA provided to the UE 104 by the base station 102. In some implementations, the timing advance value is often determined during, or as part of, a physical random access procedure (PRACH). For example, the UE 104 may send a PRACH preamble to the base station 102 and the base station 102 may respond with a random access response (RAR) message to the UE 104 that includes the timing advance value.

Timing advance value is a Medium Access Control-Control Element (MAC-CE) that is provided by the serving base station to control the UL signal transmission timing. The network, e.g., the serving base station, measures the time difference between, e.g., Physical Uplink Shared Channel (PUSCH), Physical Uplink Control Channel (PUCCH), or Sounding Reference Signal (SRS) reception and the subframe time (illustrated as TA/2 in FIG. 4). The base station may send a timing advance command to UE 104 to change the PUSCH/PUCCH transmission to make it better aligned with the subframe timing at the network side. The difference between the time of base station receiving the PUSCH/PUCCH/SRS transmitted by the UE 104 and the subframe time is related to the range or distance between the base station and the UE 104. For example, if the UE 104 is close to the base station, the PUSCH/PUCCH/SRS may arrive too early at the base station and the timing advance command to UE indicates to delay transmission, while if the UE 104 is far from the base station, the PUSCH/PUCCH/SRS may arrive to late at the base station and the Timing Advance command to UE 104 indicates to transmit early.

Thus, the timing advance command operates as an indication of the distance between UE 104 and the base station, which may be used in TA related positioning measurements, such as ECID. In ECID, for example, the identity (ID) of the serving base station for the UE 104 is provided along with the current timing advance for the UE 104. The location of the serving base station may be known by a location server, and timing advance may be used to estimate the position of the UE 104 based on the distance of the UE 104 from the location of the serving base station.

The timing advance command in a MAC-CE is a 6 bit field. Thus, the range for a timing advance value is between 0 to 63, of which half of the values are used for advancing the transmission and other half for delaying the transmission. The resolution of the absolute timing advance value, accordingly, is directly proportional to the numerology of the transmission used by the UE on that carrier. The numerology is defined by the sub-carrier spacing (the width of subcarriers in the frequency domain) for the carrier or BWP and by its cyclic prefix. For example, for LTE there is only one subcarrier spacing 15 KHz. On the other hand, 5G NR supports multiple numerology for UL from 15 KHz, 30 KHz, 60 KHz and 120 KHz. Thus, the same timing advance value (e.g., between 0 and 63) will map to a lower absolute timing advance in higher numerology compared to a lower numerology, which allows for a much finer timing advance change at a higher numerology, and accordingly, a higher numerology, i.e., higher SCS, will provide a finer resolution of UE position.

Additionally, UL and DL communications may use one of a plurality of bandwidth parts (BWPs). The BWPs are different frequencies available for UL and DL communications that, in turn, may be associated with different sub-carrier spacings (numerology). The timing advance values for the different BWPs may be different and related to the sub-carrier spacings of the BWPs. For example, BWPs with larger (higher) sub-carrier spacings may be associated with timing advance values that have higher (finer) resolution in terms of time and distance.

TA based positioning operations, such as ECID, use timing advance values to determine the position of a UE with respect to a serving cell or serving base station. Therefore, the higher resolution timing advance values associated with BWPs having higher sub-carrier spacings may be used to determine a more accurate location of the UE 104.

In 5G NR, the UE 104 may operate in multiple modes. For example, the UE 104 may operate with 5G NSA with LTE as Anchor (or MCG) and 5G as SCG. In this mode, the 5G base station may be of any numerology (i.e., while 15 KHz, 30 KHz, 60 KHz and 120 KHz), while LTE would be always 15 KHz numerology. Another mode is Uplink Carrier Aggregation (ULCA), where multiple 5G base stations may be aggregated when the numerology of each base station participating a carrier aggregation (CA) may be different. Another mode is DC (Dual Connectivity), in which the UE may be operated in different frequency bands, e.g., FR1+FR2, where one bearer operates from FR1 and the other bearer operates from FR2. Accordingly, in such modes of operation, the UE 104 may be simultaneously active on multiple cells, or base stations, which may be operating with different sub-carrier spacing (numerology). Based on the knowledge of the numerology of each cell, the UE may select and report a timing advance value from a carrier or BWP that is operated with the highest sub-carrier spacing to a location server for TA based positioning, such as ECID.

Figure 5:
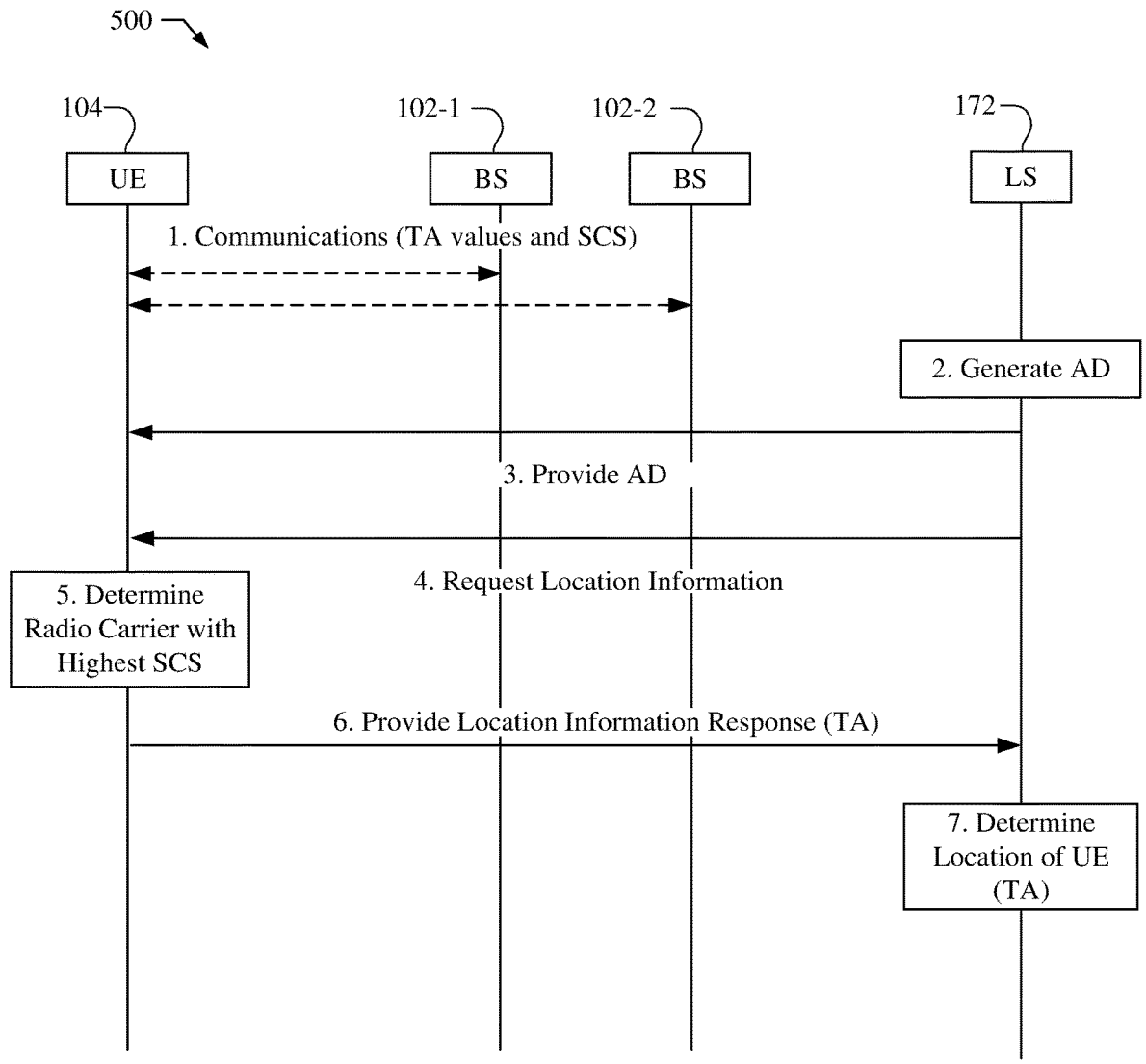
FIG. 5 is a message flow diagram with various messages sent between entities in a wireless system, which may include the UE, a first base station, a second base station, and a location server.

FIG. 5 is a message flow diagram 500 with various messages sent during a positioning session between entities in a wireless system, which may include the UE 104, a first base station 102-1, a second base station 102-2, and the location server 172. In some implementations, the first base station 102-1 may be a gNB and the second base station 102-2 may be an eNB. In other implementations, the first base station 102-1 may be an eNB and the second base station 102-2 may be an gNB. In still other implementations, the first base station 102-1 and the second base station 102-2 may both be gNBs.

A positioning session, which may include TA based positioning operations, such as ECID, may determine a location of the UE 104 based on timing advance values associated with a serving cell (or serving base station), such as either the first base station 102-1 or the second base station 102-2. When the UE 104 is communicating with a gNB, then communications between the two network entities may use radio carriers with a sub-carrier spacing (SCS) other than 15 KHz. For example, some radio carriers may have a SCS of 30 KHz, 60 KHz, 120 KHz, or other suitable sub-carrier spacings. Each SCS may have a different resolution (e.g., time and/or associated distance) for the timing advance values. For example, for a SCS of 15 KHz, each increment of timing advance value may represent a distance of approximately 78.1 meters. Other SCSs may be associated with other distances. For convenience, the SCS of a radio carrier is referred to by a numerology value $\mu$. Some example relationships between SCS and timing advance values are shown below in Table 2.

TABLE 2

| Numerology ($\mu$) | Sub-carrier Spacing (SCS) | Approximate Distance represented by each Timing Advance value |
|---|---|---|
| 0 | 15 KHz | 78.1 meters |
| 1 | 30 KHz | 39.1 meters |

TABLE 2-continued

| Numerology (μ) | Sub-carrier Spacing (SCS) | Approximate Distance represented by each Timing Advance value |
|---|---|---|
| 2 | 60 KHz | 19.5 meters |
| 3 | 120 KHz | 9.8 meters |

Thus, for a positioning session that uses timing advance values, relatively more accurate position information may be obtained by using a radio carrier with the highest available SCS.

At stage 1, the UE 104 is configured to communicate with the first base station 102-1 and/or the second base station 102-2. For example, the UE 104 may perform a RACH procedure with the first base station 102-1 and the second base station 102-2. During the RACH procedure, radio carriers (e.g., a frequency band or the like) may be determined for use by the UE 104 and the first base station 102-1 and for use by the UE 104 and the second base station 102-2. Each radio carrier may have a particular SCS. As part of the RACH procedure, the first base station 102-1 and the second base station 102-2 may determine and send respective timing advance values to the UE 104. Thus, the first base station 102-1 and the second base station 102-2 may determine timing advance values for radio carriers having particular SCS used by the UE 104.

In some implementations, the UE 104 may operate in a split bearer mode. In the split bearer mode, the UE 104 may be configured to communicate simultaneously through a first radio bearer with the first base station 102-1 and through a second radio bearer with the second base station 102-2. In particular, the UE 104 may be configured to simultaneously transmit UL data through the first radio bearer and the second radio bearer to the respective base stations.

At stage 2, the location server 172 generates assistance data. The assistance data may be used by the UE 104 to assist in providing location information to the location server 172. In some implementations, the assistance data may include a request for timing advance information from the UE 104.

At stage 3, the location server 172 provides the assistance data to the UE 104. In some implementations, the location server 172 may provide the assistance data in a positioning session message. For example, the positioning message may include GNSS, RTT, or observed time difference of arrival (OTDOA) information.

At stage 4, the location server 172 may request location information from the UE 104. In some implementations, the location server 172 may request timing advance values as indicated by the assistance data provided in stage 3. The timing advance values may directly or indirectly provide a positioning measurement of the UE 104. The request for location information may be an indication to perform a position measurement.

As stage 5, the UE 104 may determine which available radio carrier has the highest SCS. As described above, a radio carrier with a higher SCS may have timing advance values that are associated with smaller distances, and therefore may more accurately locate the UE 104. In some implementations, the UE 104 may communicate with a plurality of base stations and therefore a plurality of radio carriers. The UE 104 may determine which radio carrier associated with the plurality of base stations has the highest SCS.

In some implementations, if more than one radio carrier has an identical SCS, then the UE 104 may use the radio carrier that has more frequent updates of the timing advance values. For example, the UE 104 may use the radio carrier associated based on a timeAlignmentTimer value that indicates how frequently the timing advance values are updated. In some other implementations, the UE 104 may determine a ranking or ordering of radio carriers based on SCS (numerology). For example, the radio carriers may be ranked or ordered be from highest SCS (numerology) to lowest SCS (numerology). In some implementations, the ranking or ordering may further use the frequency of updates of the timing advance values (e.g., timeAlignmentTimer value) if radio carrier has an identical SCS.

At stage 6, the UE 104 provides the timing advance value associated with the radio carrier with the highest SCS to the location server 172. The UE 104 may also provide a carrier identifier (ID) to indicate which radio carrier is associated with the timing advance value. In some implementations, the UE 104 may provide more than one timing advance value. In those cases, the UE 104 may provide timing advance values (and associated carrier IDs) based on the ranking or ordering of radio carriers based on sub-carrier spacing (numerology) or based on sub-carrier spacing (numerology) and frequency of updates. In other words, the UE 104 may provide to the location server 172 multiple timing advance values associated with multiple base stations ordered based on highest sub-carrier spacing (numerology) and frequency of updates if sub-carrier spacing is the same.

At stage 7, the location server 172 determines the location of the UE 104 based on the timing advance values and carrier IDs from the UE 104. In some implementations, the location server 172 may perform ECID operations using timing advance values from one or more base stations (e.g., more than one timing advance values and carrier IDs) to determine the location of the UE 104. In some other implementations, the UE 104 may return operations to a previous radio carrier after the duration of the positioning session (as indicated in stage 3).

Figure 6:
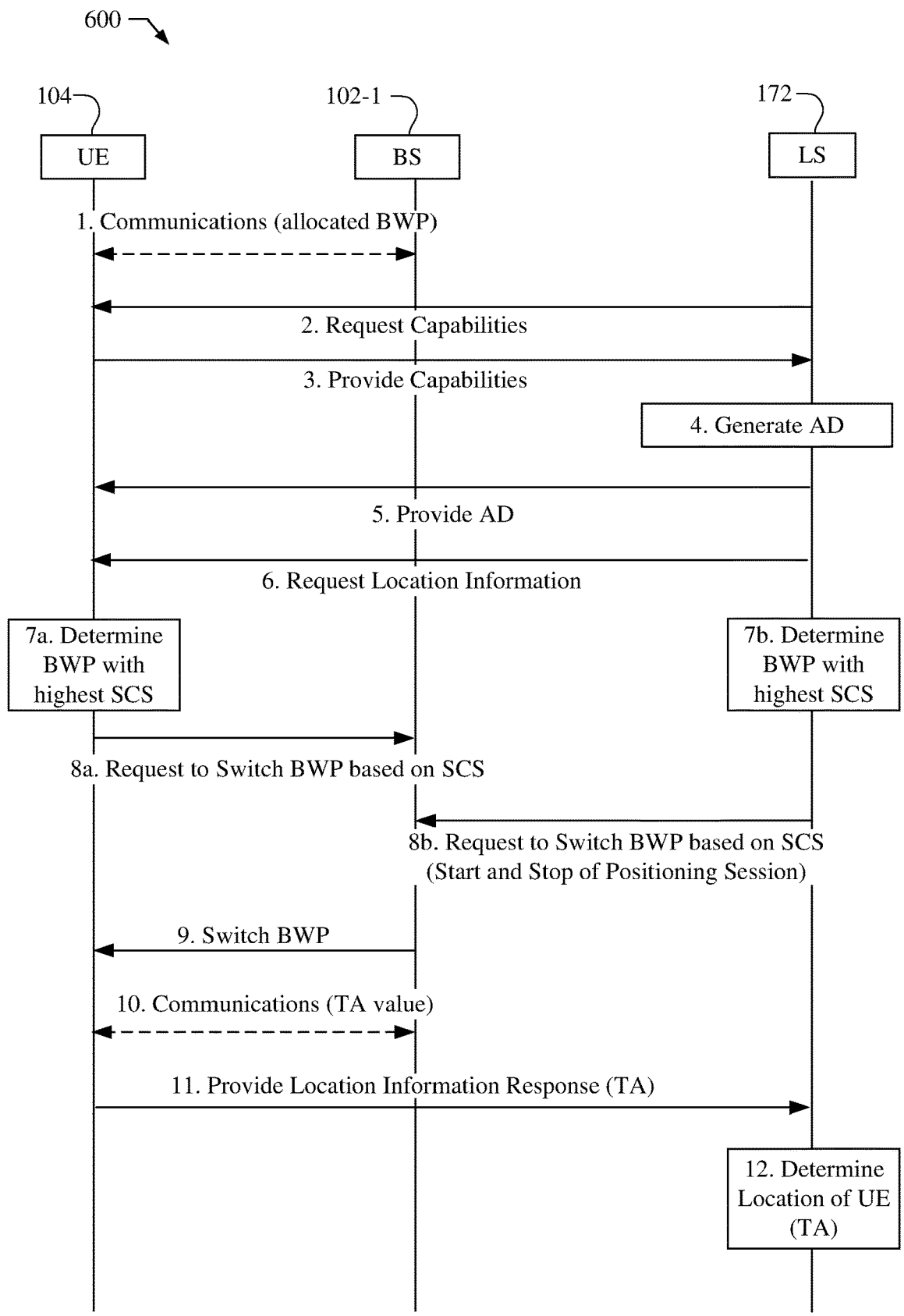
FIG. 6 is another message flow diagram with various messages sent between entities in a wireless system, which may include the UE, a first base station, and a location server.

FIG. 6 is another message flow diagram 600 with various messages sent in a positioning session between entities in a wireless system, which may include the UE 104, a base station 102-1, and the location server 172. The base station 102-1 may be a gNB. In some implementations, communications between the UE 104 and the base station 102-1 may be through one or more BWPs. Each BWP may be separate and distinct from other BWPs. For example, a first BWP may have a first SCS and a second BWP may have a second SCS different from the first SCS. Since different BWPs may have different SCS, the BWP having the highest SCS (and therefore the timing advance values associated with the shortest distance) may be used to determine the location of the UE 104.

At stage 1, the UE 104 is configured to communicate with the first base station 102-1. For example, the UE 104 may perform a RACH procedure with the first base station 102-1 where a plurality of BWPs is allocated to the UE 104 to transmit and receive UL and DL data. Each BWP may have an associated SCS. For each BWP used by the UE 104, the first base station 102-1 may determine and send associated timing advance values (based on the associated SCS) to the UE 104.

At stage 2, the location server 172 requests capabilities of the UE 104. For example, the location server 172 may request at least the BWP capabilities of the UE 104.

At stage 3, the UE 104 provides BWP capabilities to the location server 172. In this manner, the location server 172 may determine which BWPs are allocated (e.g., available) to the UE 104. Because the BWP capabilities are determined by the UE 104 and the first base station 102-1 at stage 1 (without direction or intervention by the location server 172), stage 3 enables the location server 172 to learn about the BWP capabilities of the UE 104.

At stage 4, the location server 172 generates assistance data. The assistance data may be used by at UE 104 to assist in providing location information to the location server 172. In some implementations, the assistance data may include a request for timing advance information from the UE 104.

At stage 5, the location server 172 provides assistance data to the UE 104. In some implementations, the location server 172 may provide the assistance data in a positioning session message. For example, the positioning message may include GNSS, RTT, or OTDOA information.

At stage 6, the location server 172 requests location information from the UE 104. In some implementations, the location server 172 may request timing advance information (e.g., values) associated with the BWP used by the UE. The request for location information may be an indication to perform a position measurement. In still other implementations, the location server 172 may specify a start and a stop time of (e.g., schedule) a positioning session.

At stage 7a, the UE 104 determines the BWP with the highest SCS. Since the UE 104 may be able to communicate with the first base station 102-1 through one of a plurality of allocated BWPs, the UE 104 may determine which allocated BWP has the highest SCS. In some implementations, the UE 104 may determine a ranking or ordering of BWPs based on SCS (numerology). For example, the BWPs may be ranked or ordered from highest SCS (numerology) to lowest SCS (numerology). Next at stage 8a, the UE 104 may send a request, such as a BWP switch request via the first base station 102-1, to switch to the BWP with the highest SCS (as determined in stage 7a). In some implementations, the UE 104 may rank allocated BWPs in descending SCS order and send a plurality of BWP switch requests based on rank order to the first base station 102-1 to switch the UE 104 to the plurality of BWPs.

Alternatively, or in addition to stage 7a, at stage 7b the location server 172 may determine the BWP with the highest SCS. The location server 172 is aware of the BWPs allocated to the UE 104 from the capabilities provided by the UE 104 at stage 3. In some implementations, the location server 172 may determine a ranking or ordering of BWP based on SCS (numerology). For example, the BWPs may be ranked or ordered from highest SCS (numerology) to lowest SCS (numerology). Although stage 7b is shown after stage 6, in other implementations, stage 7b may occur at other feasible positions in the message flow diagram 600. By way of example and not limitation, stage 7b may occur after stage 3. Then, at stage 8b, the location server 172 may send a request, such as a BWP switch request via the first base station 102-1, to switch to the BWP with the highest SCS (as determined in stage 7b). In some implementations, the location server 172 may rank available BWPs in descending SCS order and send a plurality of BWP switch requests based on rank order to the first base station 102-1 to switch the UE 104 to the plurality of BWPs. In some implementations, the location server 172 may schedule a switch to a BWP (for example, by scheduling the transmission of the BWP switch request) based on start and stop times of a positioning session (as indicated in stage 6). In some other implementations, At stage 9, the first base station 102-1 switches to the requested BWP and sends a switch BWP message to the UE 104. In some implementations, the switch request may come from the UE 104 (as described in stage 8a or from the location server 172 (as described in stage 8b). For example, the UE 104 and the first base station 102-1 may operate in a first BWP, receive a BWP switch request (as in stages 8a or 8b), then switch to a second BWP based on the BWP switch request. In some implementations, the UE 104 and the first base station 102-1 may continue to operate in the first BWP until the BWP switch request is received or such time as the UE 104 and the first base station 102-1 are able to move operations to the second BWP. In some other implementations, the BWP switch request may be included in a radio resource control message (RRC) or a downlink control indicator (DCI) message from the first base station 102-1.

In some implementations, the first base station 102-1 may send a second BWP switch request to the UE 104. The second BWP switch request may request that communications between the first base station 102-1 and the UE 104 switch to a third BWP from the BWPs allocated in stage 1. The third BWP may have a lower SCS than the second BWP and may have a higher SCS than other allocated or available BWPs. In some implementations, multiple BWP switch requests may be ordered in descending order of SCS.

At stage 10, the UE 104 and the first base station 102-1 may transmit and receive data, including UL and DL data and a timing advance value for the current BWP and is provided to the UE 104 by the first base station 102-1, e.g., in a MAC-CE. It should be understood that stage 10 may be performed any time after the BWP switch at stage 8 and may occur before or after stage 9. In some implementations, the UE 104 may provide multiple timing advance value measurements to the location server 172, and the UE 104 and first base station 102-1 may switch to different BWPs, e.g., stages 7a, 8, and 10 may be performed multiple times, to obtain multiple timing advance values.

At stage 11, the UE 104 provides the timing advance value associated with the current BWP to the location server 172. In some implementations, the UE 104 may provide more than one timing advance value. In those cases, the UE 104 may provide timing advance values based on a ranking or ordering of different BWPs based on SCS (numerology), or frequency of updates to the timing advance values.

At stage 12, the location server 172 may determine the location of the UE 104, based on the timing advance values from the UE 104. In some implementations, the location server 172 may perform ECID operations using timing advance values from one or more base stations to determine the location of the UE 104. In some implementations, after the positioning session, the location server 172 may send a message to the first base station 102-1 to the return the UE 104 and the first base station 102-1 to the BWP in use prior to the positioning session. In some other implementations, the UE 104 may return operations to a previous BWP after the duration of the positioning session (as indicated in stage 6).

Figure 7:
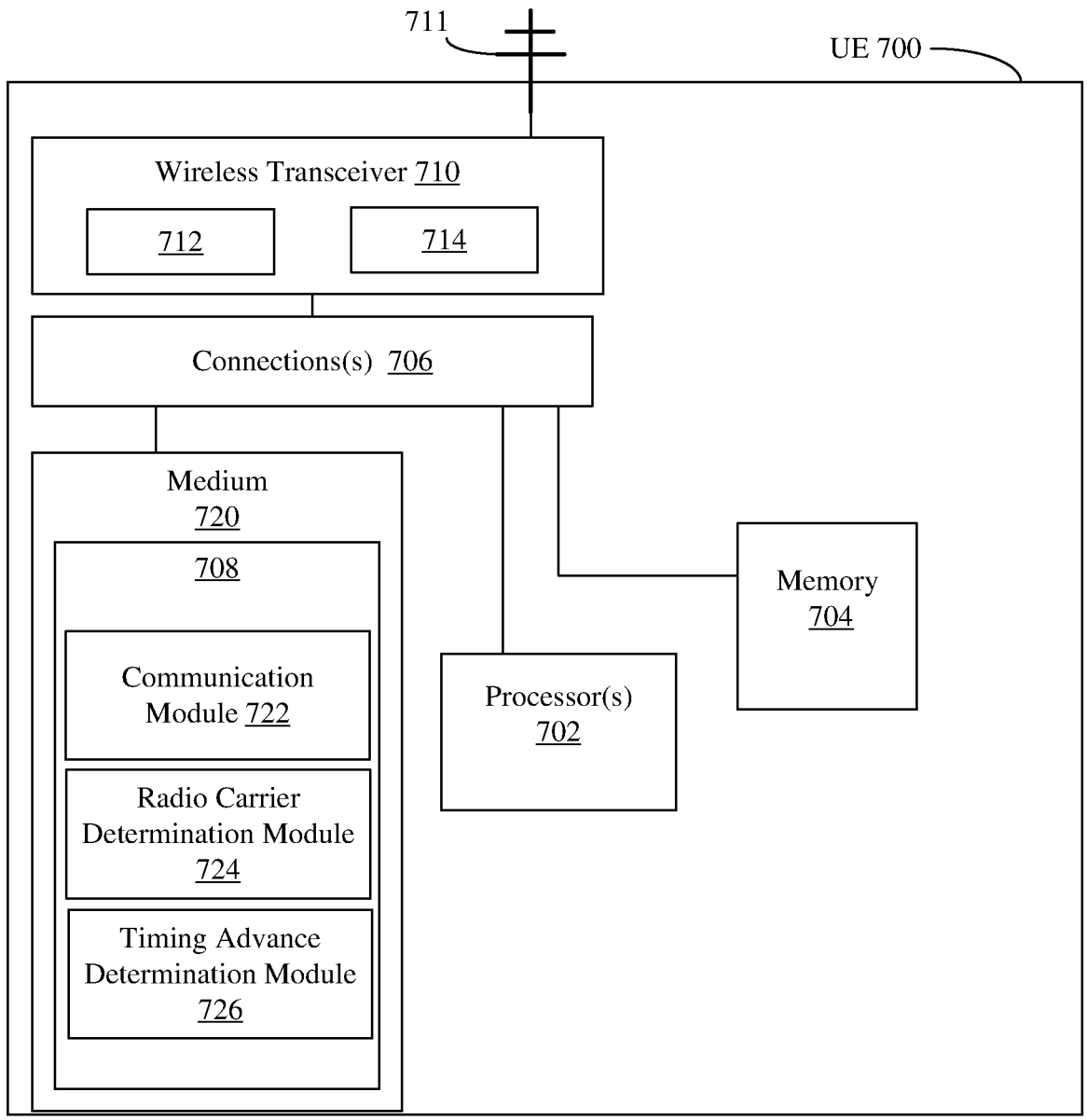
FIG. 7 shows a schematic block diagram illustrating certain exemplary features of a user equipment that is configured to perform positioning within a wireless network, as described herein.

FIG. 7 shows a block diagram illustrating certain exemplary features of a UE 700 that is configured to perform positioning within a wireless network, as described herein. The UE 700 may be an example of the UEs 104 of FIGS. 1, 3, 5 and 6 and/or the UE 204 of FIGS. 2A and 2B. shown in FIGS. 1, 3, 5 and 6, or the UE 204 in FIGS. 2A and 2B, in a manner consistent with disclosed implementations. The UE 700 may, for example, include one or more processors 702, memory 704, an external interface such as at least one wireless transceiver 710 (e.g., wireless network interface), which may be operatively coupled with one or more connections 706 (e.g., buses, lines, fibers, links, etc.) to a non-transitory computer readable medium 720 and memory 704. The UE 700 may further include additional items, which are not shown, such as a user interface that may include e.g., a display, a keypad or other input device, such as virtual keypad on the display, through which a user may interface with the UE. In certain example implementations, all or part of UE 700 may take the form of a chipset, and/or the like. Wireless transceiver 710 may, for example, include a transmitter 712 enabled to transmit one or more signals over one or more types of wireless communication networks and a receiver 714 to receive one or more signals transmitted over the one or more types of wireless communication networks.

In some implementations, UE 700 may include a UE antenna 711, which may be internal or external. UE antenna 711 may be used to transmit and/or receive signals processed by wireless transceiver 710. In some embodiments, UE antenna 711 may be coupled to wireless transceiver 710. In some implementations, measurements of signals received (transmitted) by UE 700 may be performed at the point of connection of the UE antenna 711 and wireless transceiver 710. For example, the measurement point of reference for received (transmitted) RF signal measurements may be an input (output) terminal of the receiver 714 (transmitter 712) and an output (input) terminal of the UE antenna 711. In a UE 700 with multiple UE antennas 711 or antenna arrays, the antenna connector may be viewed as a virtual point representing the aggregate output (input) of multiple UE antennas.

The one or more processors 702 may be implemented using a combination of hardware, firmware, and software. For example, the one or more processors 702 may be configured to perform the functions discussed herein by implementing one or more instructions or program code 708 on a non-transitory computer readable medium, such as medium 720 and/or memory 704. In some embodiments, the one or more processors 702 may represent one or more circuits configurable to perform at least a portion of a data signal computing procedure or process related to the operation of UE 700.

The medium 720 and/or memory 704 may store instructions or program code 708 that contain executable code or software instructions that when executed by the one or more processors 702, cause the one or more processors 702 to operate as a special purpose computer programmed to perform the techniques disclosed herein. As illustrated in UE 700, the medium 720 and/or memory 704 may include one or more components or modules that may be implemented by the one or more processors 702 to perform the methodologies described herein. While the components or modules are illustrated as software in medium 720 that is executable by the one or more processors 702, it should be understood that the components or modules may be stored in memory 704 or may be dedicated hardware either in the one or more processors 702 or off the processors.

A number of software modules and data tables may reside in the medium 720 and/or memory 704 and be utilized by the one or more processors 702 in order to manage both communications and the functionality described herein. It should be appreciated that the organization of the contents of the medium 720 and/or memory 704 as shown in UE 700 is merely exemplary, and as such the functionality of the modules and/or data structures may be combined, separated, and/or be structured in different ways depending upon the implementation of the UE 700.

The medium 720 and/or memory 704 may include a communication module 722 that when implemented by the one or more processors 702 configures the one or more processors 702 to communicate with wireless devices such as one or more network entities or any other feasible wireless device. In some implementations, execution of the communication module 722 may cause the UE 700 to wirelessly communicate with a plurality of network entities simultaneously. In some other implementations, execution of the communication module 722 may cause the UE 700 to communicate with one or more base stations using a plurality of radio carriers, each of the plurality of radio carriers being associated with a different base station. In some other implementations, execution of the communication module 722 may cause the UE 700 to receive an indication to obtain a positioning measurement that includes timing advance information. In some other implementations, execution of the communication module 722 may cause the UE 700 to transmit a positioning measurement comprising the first timing advance value and the first carrier ID of the first radio carrier.

In some implementations, execution of the communication module 722 may cause the UE 700 to receive a positioning session message from a location server to obtain a positioning measurement that includes a timing advance value. In some other implementations, execution of the communication module 722 may cause the UE 700 to send one or more messages to a serving base station requesting the serving base station to switch the UE to a one or more bandwidth parts based on sub-carrier spacing. In some other implementations, execution of the communication module 722 may cause the UE 700 to receive a bandwidth part switch request from a serving base station. In some other implementations, execution of the communication module 722 may cause the UE 700 to transmit, to a location server, a positioning measurement that includes timing advance values, where a location of the UE is determined based on the timing advance values.

In some implementations, execution of the communication module 722 may cause the UE 700 to receive an indication to perform a timing advance positioning measurement. In some other implementations, execution of the communication module 722 may cause the UE 700 to send or receive a positioning session message. The positioning session message may include a request to provide location information.

The medium 720 and/or memory 704 may include a radio carrier determination module 724 that, when implemented by the one or more processors 702, configures the one or more processors 702 to determine one or more radio carriers having a highest sub-carrier spacing from available radio carriers. For example, execution of the radio carrier determination module 724 may cause the UE 700 to determine which radio carrier, of available radio carriers, has the highest SCS. In some implementations, execution of the radio carrier determination module 724 may cause the UE 700 to determine and/or rank radio carriers based on rate of updates to the timing advance values. For example, the UE 700 may determine which radio carriers have the greatest frequency (most frequent) updates of timing advance values. In some implementations, the radio carriers may be associated with different base stations.

In some implementations, execution of the radio carrier determination module 724 may cause the UE 700 to determine and/or rank available BWPs in order of SCS. For example, the UE 700 may determine which BWP (of available BWPs) has the highest SCS. In some other implementations, execution of the radio carrier determination module 724 may cause the UE 700 to determine multiple radio carriers and/or BWPs in descending or ascending order of SCS. For example, the UE 700 may determine a first BWP having the highest SCS and a second BWP having a second highest SCS. In some other implementations, execution of the radio carrier determination module 724 may cause the UE 700 to use a previously allocated BWP while waiting to receive a BWP switch request to switch to a different BWP.

The medium 720 and/or memory 704 may include a timing advance determination module 726 that, when implemented by the one or more processors 702, configures the one or more processors 702 to determine the timing advance value associated with one or more radio carriers and/or one or more BWP. In some implementations, execution of the timing advance determination module 726 may cause the UE 700 to determine one or more carrier IDs associated with the determined timing advance values.

The methodologies described herein may be implemented by various means depending upon the application. For example, these methodologies may be implemented in hardware, firmware, software, or any combination thereof. For a hardware implementation, the one or more processors 702 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 720 or memory 704 that is connected to and executed by the one or more processors 702. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 708 on a non-transitory computer readable medium, such as medium 720 and/or memory 704. Examples include computer readable media encoded with a data structure and computer readable media encoded with a computer program 708. For example, the non-transitory computer readable medium including program code 708 stored thereon may include program code 708 to support positioning of a UE in a manner consistent with disclosed embodiments. Non-transitory computer readable medium 720 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 708 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 720, instructions and/or data may be provided as signals on transmission media included in a communication apparatus. For example, a communication apparatus may include a wireless transceiver 710 having signals indicative of instructions and data. The instructions and data are configured to cause one or more processors to implement the functions outlined in the claims. That is, the communication apparatus includes transmission media with signals indicative of information to perform disclosed functions.

Memory 704 may represent any data storage mechanism. Memory 704 may include, for example, a primary memory and/or a secondary memory. Primary memory may include, for example, a random access memory, read only memory, etc. While illustrated in this example as being separate from one or more processors 702, it should be understood that all or part of a primary memory may be provided within or otherwise co-located/coupled with the one or more processors 702. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 720. As such, in certain example implementations, the methods and/or apparatuses presented herein may take the form in whole or part of a computer readable medium 720 that may include computer implementable code 708 stored thereon, which if executed by one or more processors 702 may be operatively enabled to perform all or portions of the example operations as described herein. Computer readable medium 720 may be a part of memory 704.

Figure 8:
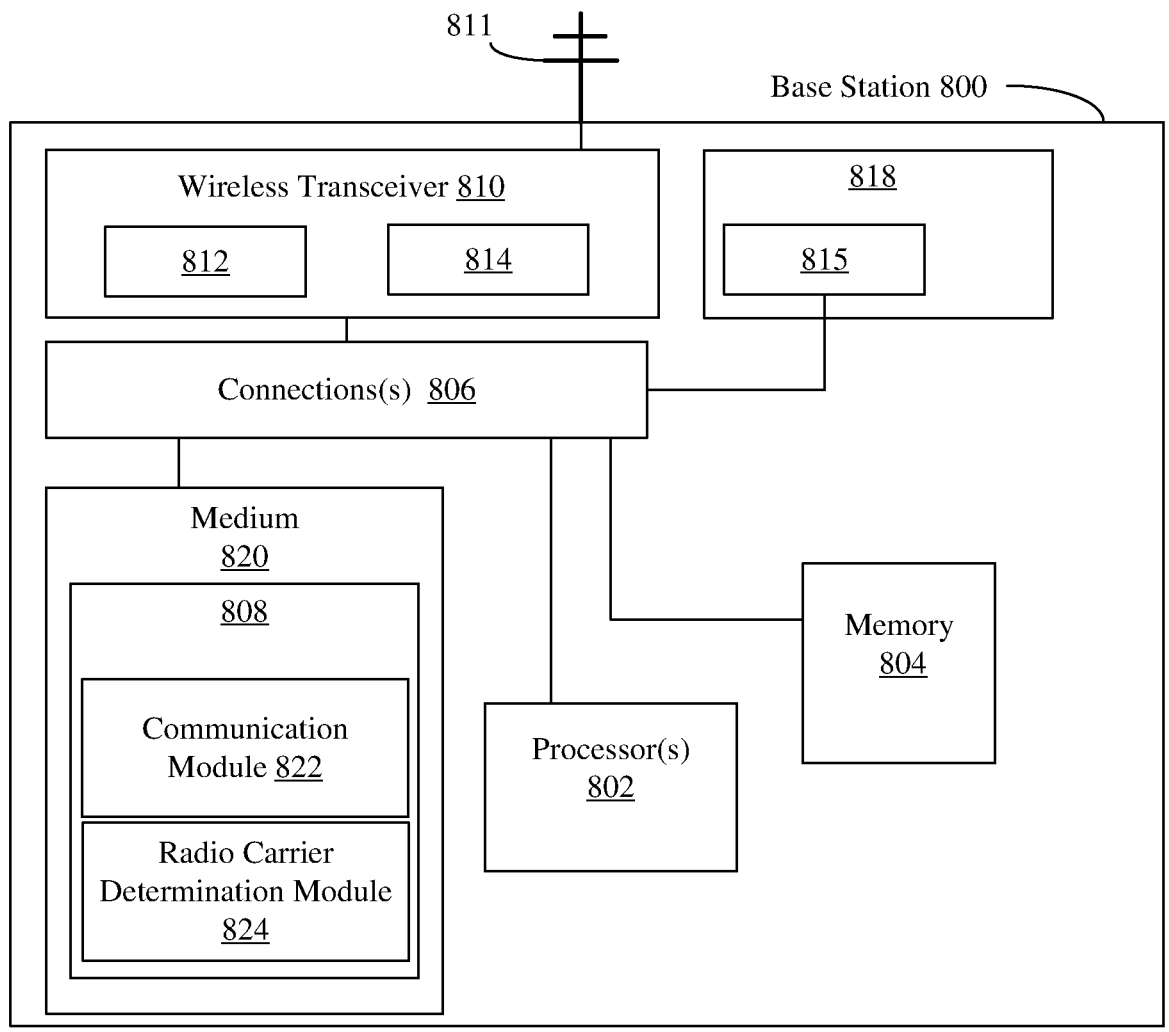
FIG. 8 shows a schematic block diagram illustrating certain exemplary features of a base station that are configured to perform positioning operations for a user equipment within a wireless network, as described herein.

FIG. 8 shows a schematic block diagram illustrating certain exemplary features of a base station 800, e.g., which may be base station 102 shown in FIGS. 1 and 3, and base stations 102-1 and 102-2 shown in FIGS. 5 and 6 that are configured to perform positioning operations for a UE within a wireless network, as described herein. The base station 800 may, for example, include one or more processors 802, memory 804, an external interface such as at least one wireless transceiver 810 (e.g., wireless network interface), a wired interface 815, and communications interface 818 (e.g., wireline or wireless network interface to other base stations and/or the core network and a location server), which may be operatively coupled with one or more connections 806 (e.g., buses, lines, fibers, links, etc.) to non-transitory computer readable medium 820 and memory 804. In certain example implementations, all or part of base station 800 may take the form of a chipset, and/or the like. Wireless transceiver 810 may, for example, include a transmitter 812 enabled to transmit one or more signals over one or more types of wireless communication networks and a receiver 814 to receive one or more signals transmitted over the one or more types of wireless communication networks. The wired interface 815 may be operatively coupled with one or more connections 806 to non-transitory computer readable medium 820 and memory 804. In some implementations, the wired interface 815 may provide a wireline (copper, fibre, or any other technically feasible conductor) connection to a network to, for example, provide a backhaul connection to other network entities such as other UEs, a location server, or the like. In some other implementations, a similar wired connection may be provided by the communication interface 818 (not shown for simplicity).

In some embodiments, base station 800 may include antenna 811, which may be internal or external. Base station antenna 811 may be used to transmit and/or receive signals processed by wireless transceiver 810. In some embodiments, base station antenna 811 may be coupled to wireless transceiver 810. In some embodiments, measurements of signals received (transmitted) by base station 800 may be performed at the point of connection of the antenna 811 and wireless transceiver 810. For example, the measurement point of reference for received (transmitted) RF signal measurements may be an input (output) terminal of the receiver 814 (transmitter 812) and an output (input) terminal of the antenna 811. In a base station 800 with multiple antennas 811 or antenna arrays, the antenna connector may be viewed as a virtual point representing the aggregate output (input) of multiple UE antennas.

The one or more processors 802 may be implemented using a combination of hardware, firmware, and software. For example, the one or more processors 802 may be configured to perform the functions discussed herein by implementing one or more instructions or program code 808 on a non-transitory computer readable medium, such as medium 820 and/or memory 804. In some embodiments, the one or more processors 802 may represent one or more circuits configurable to perform at least a portion of a data signal computing procedure or process related to the operation of base station 800.

The medium 820 and/or memory 804 may store instructions or program code 808 that contain executable code or software instructions that when executed by the one or more processors 802 cause the one or more processors 802 to operate as a special purpose computer programmed to perform the techniques disclosed herein. As illustrated in base station 800, the medium 820 and/or memory 804 may include one or more components or modules that may be implemented by the one or more processors 802 to perform the methodologies described herein. While the components or modules are illustrated as software in medium 820 that is executable by the one or more processors 802, it should be understood that the components or modules may be stored in memory 804 or may be dedicated hardware either in the one or more processors 802 or off the processors.

A number of software modules and data tables may reside in the medium 820 and/or memory 804 and be used by the one or more processors 802 in order to manage both communications and the functionality described herein. It should be appreciated that the organization of the contents of the medium 820 and/or memory 804 as shown in base station 800 is merely exemplary, and as such the functionality of the modules and/or data structures may be combined, separated, and/or be structured in different ways depending upon the implementation of the base station 800.

The medium 820 and/or memory 804 may include a communication module 822 that, when implemented by the one or more processors 802, configures the one or more processors 802 to transmit and receive messages. For example, execution of the communication module 822 may cause the base station 800 to transmit and receive wireless messages through the wireless transceiver 810 via one or more radio carriers and/or one or more BWPs. In some implementations, execution of the communication module 822 may cause the base station 800 to transmit and/or receive BWP switch requests, and/or positioning session messages. In some implementations, execution for the communication module 822 may cause the base station 800 to send or receive RACH messages, RRC messages, and/or DCI messages.

The medium 820 and/or memory 804 may include a radio carrier determination module 824 that, when implemented by the one or more processors 802, configures the one or more processors 802 to determine one or more radio carriers and/or one or more BWPs to use for communications with other network entities. For example, execution of the radio carrier determination module 824 may cause the base station 800 to determine which BWP, of available BWPs, to use based on operating conditions of the base station 800. In some implementations, execution of the radio carrier determination module 824 may cause the base station 800 to respond to BWP switch requests.

The methodologies described herein may be implemented by various means depending upon the application. For example, these methodologies may be implemented in hardware, firmware, software, or any combination thereof. For a hardware implementation, the one or more processors 802 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 820 or memory 804 that is connected to and executed by the one or more processors 802. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 808 on a non-transitory computer readable medium, such as medium 820 and/or memory 804. Examples include computer readable media encoded with a data structure and computer readable media encoded with a computer program 808. For example, the non-transitory computer readable medium including program code 808 stored thereon may include program code 808 to support positioning of a UE at a specified time point with a measurement period in a manner consistent with disclosed embodiments. Non-transitory computer readable medium 820 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 808 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 820, instructions and/or data may be provided as signals on transmission media included in a communication apparatus. For example, a communication apparatus may include a wireless transceiver 810 having signals indicative of instructions and data. The instructions and data are configured to cause one or more processors to implement the functions outlined in the claims. That is, the communication apparatus includes transmission media with signals indicative of information to perform disclosed functions.

Memory 804 may represent any data storage mechanism. Memory 804 may include, for example, a primary memory and/or a secondary memory. Primary memory may include, for example, a random access memory, read only memory, etc. While illustrated in this example as being separate from one or more processors 802, it should be understood that all or part of a primary memory may be provided within or otherwise co-located/coupled with the one or more processors 802. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 820. As such, in certain example implementations, the methods and/or apparatuses presented herein may take the form in whole or part of a computer readable medium 820 that may include computer implementable code 808 stored thereon, which if executed by one or more processors 802 may be operatively enabled to perform all or portions of the example operations as described herein. Computer readable medium 820 may be a part of memory 804.

Figure 9:
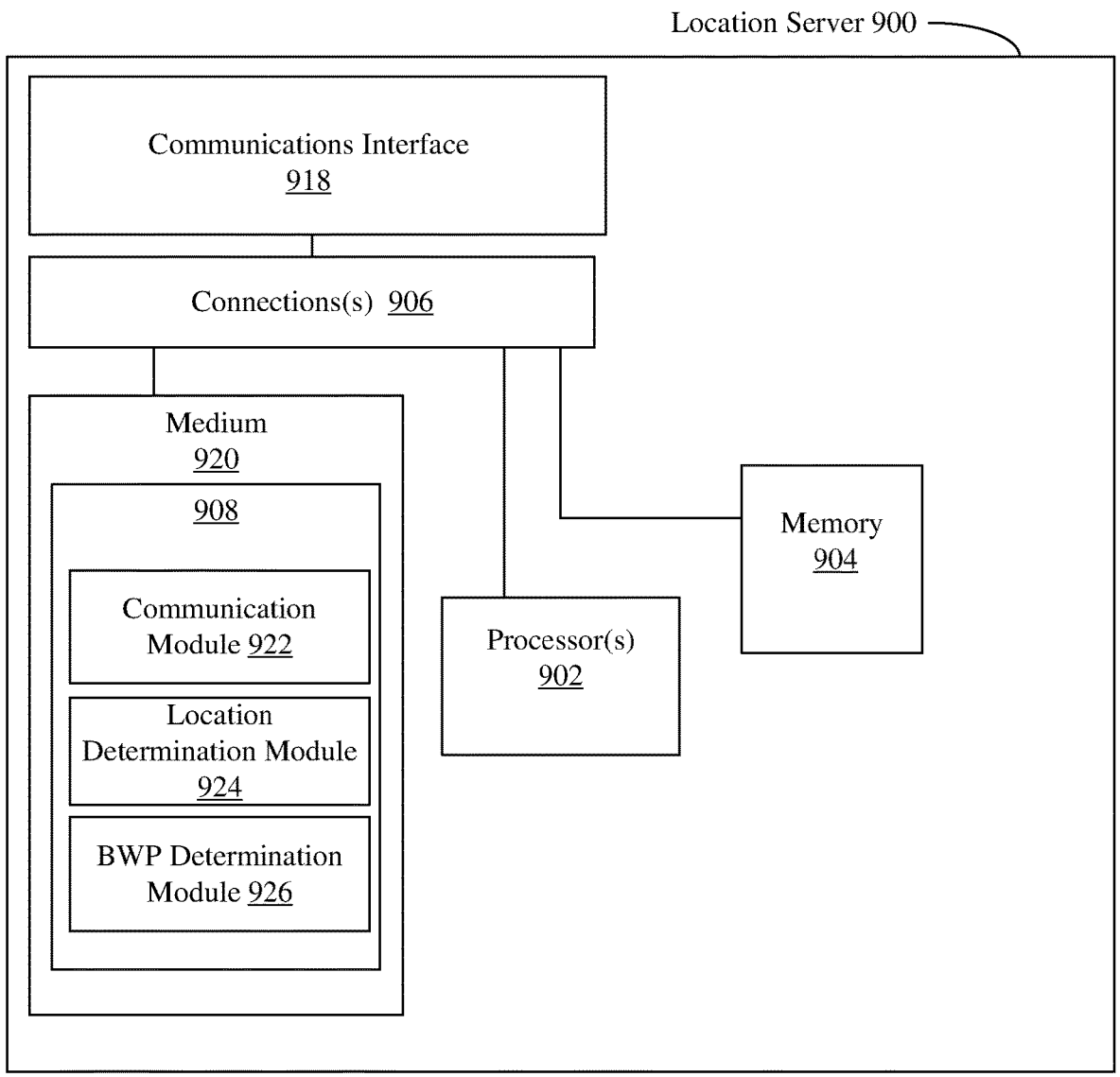
FIG. 9 shows a schematic block diagram illustrating certain exemplary features of a location server that is configured to perform positioning for a user equipment within a wireless network, as described herein.

FIG. 9 shows a schematic block diagram illustrating certain exemplary features of a location server 900, e.g., LMF 196 in FIG. 1, or the location server 172 as shown in FIGS. 1, 5, and 6 that is configured to perform positioning for a UE within a wireless network, as described herein. Location server 900 may, for example, include one or more processors 902, memory 904, an external interface, which may include a communications interface 918 (e.g., wireline or wireless network interface to base stations and/or entities in the core network), which may be operatively coupled with one or more connections 906 (e.g., buses, lines, fibers, links, etc.) to non-transitory computer readable medium 920 and memory 904. In certain example implementations, all or part of location server 900 may take the form of a chipset, and/or the like.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of location server 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in location server 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in location server 900 is merely exemplary, and as such the functionality of the modules and/or data structures may be combined, separated, and/or be structured in different ways depending upon the implementation of the location server 900.

The medium 920 and/or memory 904 may include a communication module 922 that, when implemented by the one or more processors 902, configures the one or more processors 902 to transmit and receive messages. For example, execution of the communication module 922 may cause the location server 900 to transmit and receive wireless or wireline messages through the communication interface 918. The wireless or wireline messages may be transmitted and received through a network. In some implementations, execution of the communication module 922 may cause the location server 900 to transmit an indication to perform a timing advance positioning measurement. In some implementations, execution of the communication module 922 may cause the location server 900 to receive a positioning measurement including a timing advance value. In some implementations, execution of the communication module 922 may cause the location server 900 to send one or more messages to a serving base station requesting that the serving base station switch a UE to a particular radio carrier and/or BWP. For example, the location server 900 may transmit a message to a serving base station to switch a UE to a radio carrier or BWP having a highest SCS of available radio carriers or BWPs.

The medium 920 and/or memory 904 may include a location determination module 924 that, when implemented by the one or more processors 902, configures the one or more processors 902 to determine a location of a UE. For example, execution of the location determination module 924 may cause the location server 900 to transmit assistance data to a network entity. In some implementations, execution of the location determination module 924 may cause the location server 900 to transmit a request for location information and receive location information in response to the location information request. In some implementations, the location information may include timing advance values. In some implementations, execution of the location determination module 924 may cause the location server 900 to determine the location of the UE based on the timing advance information. In some other implementations, execution of the location determination module 924 may cause the location server 900 to determine the location of the UE using ECID operations.

The medium 920 and/or memory 904 may include a BWP determination module 926 that, when implemented by the one or more processors 902, configures the one or more processors 902 to determine a BWP for a UE to use. In some implementations, execution of the BWP determination module 926 may cause the location server 900 to determine, from available BWPs, the BWP with the highest SCS and send a BWP switch request to a UE to switch to the BWP with the highest SCS. In some other implementations, execution of the BWP determination module 926 may cause the location server 900 to rank available BWPs in order based on SCS associated with the available BWPs.

In some implementations, execution of the BWP determination module 926 may cause the location server 900 to transmit one or more BWP switch requests to use one or more different BWPs.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support positioning of a UE at a specified time point with a measurement period in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 908 in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a communications interface 918 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable code 908 stored thereon, which if executed by one or more processors 902 may be operatively enabled to perform all or portions of the example operations as described herein. Computer readable medium 920 may be a part of memory 904.

Figure 10:
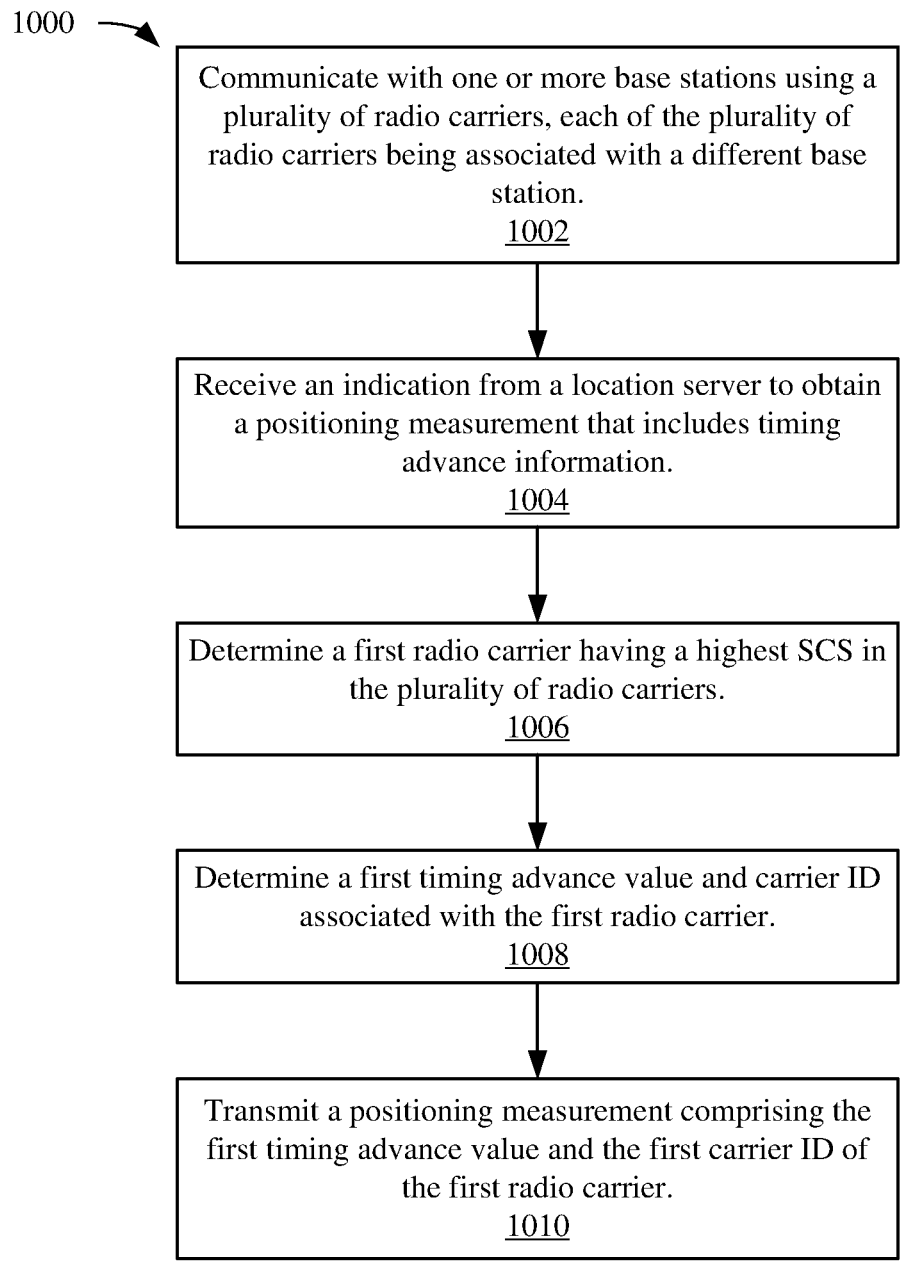
FIG. 10 shows a flowchart for an exemplary method for supporting positioning of a user equipment in a wireless network performed by a user equipment.

FIG. 10 shows a flowchart for an exemplary method 1000 for supporting positioning of a user equipment (UE) in a wireless network performed by a UE, such as UE 104 as shown in FIGS. 1, 3, 5 and 6, or the UE 204 in FIGS. 2A and 2B, in a manner consistent with disclosed implementations.

At block 1002, the UE 104 communicates with one or more base stations using a plurality of radio carriers, each of the plurality of radio carriers being associated with a different base station. In one implementation, the UE 104 may communicate with a serving base station and one or more neighboring (e.g., other) base stations. The serving base station and the one or more neighboring base stations may be gNB base stations. Each base station may be associated with a radio carrier. In some implementations, a different radio carrier may be associated with each base station. Furthermore, each radio carrier may have a different SCS. A means for communicating, by the UE, with one or more serving base stations using a plurality of radio carriers, each of the plurality of radio carriers being associated with a different base station may include, e.g., the wireless transceiver 710 and one or more processors 702 with dedicated hardware or implementing executable code or software instructions in memory 704 and/or medium 720 such as the communication module 722 in UE 700 shown in FIG. 7.

At block 1004, the UE receives an indication from a location server to obtain a positioning measurement that includes timing advance information. In one implementation, the location server 172 may indicate to the UE to determine timing advance information associated with available radio carriers. A means for receiving an indication to obtain a positioning measurement that includes timing advance information may include, e.g., the wireless transceiver 710 and one or more processors 702 with dedicated hardware or implementing executable code or software instructions in memory 704 and/or medium 720 such as the communication module 722.

At block 1006, the UE determines a first radio carrier having a highest SCS in the plurality of radio carriers. As described above with respect to block 1002, the UE may communicate with a plurality of radio carriers. In one implementation, the UE may determine the radio carrier (from the plurality of radio carriers) having the highest SCS. A means for determining a first radio carrier having a highest sub-carrier spacing in the plurality of radio carriers may include, e.g., the wireless transceiver 710 and one or more processors 702 with dedicated hardware or implementing executable code or software instructions in memory 704 and/or medium 720 such as the radio carrier determination module 724.

If more than one radio carrier is available (for example, the UE may be communicating with multiple base stations through multiple radio carriers), then the UE may rank or order the available radio carriers in order of SCS. In some implementations, the UE may order the radio carriers from highest SCS to lowest SCS. For example, the UE may select a second radio carrier from the plurality of radio carriers based on the sub-carrier spacing of the plurality of radio carriers and determine a second timing advance value and a second carrier ID associated with a second radio carrier, wherein the second radio carrier has a sub-carrier spacing that is less than the sub-carrier spacing of the first radio carrier. The positioning measurement, for example, may comprise the second timing advance value and the second carrier ID and the first timing advance value and the first carrier ID ordered based on highest sub-carrier spacing. A means for selecting a radio carrier from a plurality of radio carriers based on the sub-carrier spacing of a plurality of radio carriers may include, e.g., the wireless transceiver 710 and one or more processors 702 with dedicated hardware or implementing executable code or software instructions in memory 704 and/or medium 720 such as the radio carrier determination module 724. Furthermore, the ranking or ordering of radio carriers may be based on a frequency of updates of the timing advance values. That is, radio carriers that have timing advance values that are more frequently updated may be ranked higher than radio carriers that have timing advance values that are less frequently updated. In one implementation, the first radio carrier may be in a group of radio carriers determined to have the highest sub-carrier spacing of the plurality of radio carriers, and the UE may further determine that the first radio carrier has a greatest frequency of updates of timing advance values associated with each radio carrier in the group of radio carriers. A means for determining the first radio carrier has a greatest frequency of updates of timing advance values associated with each radio carrier in the group of radio carriers may include, e.g., the wireless transceiver 710 and one or more processors 702 with dedicated hardware or implementing executable code or software instructions in memory 704 and/or medium 720 such as the radio carrier determination module 724.

At block 1008, the UE determines a first timing advance value and a first carrier ID associated with the first radio carrier. In other words, for the first radio carrier determined above in block 1006, the UE may determine an associated timing advance value and an associated carrier ID. In some implementations, the UE may determine more than one timing advance value (and more than one associated carrier ID). For example, some ECID operations may allow multiple timing advance values. In such cases, the UE may select multiple timing advance values (from radio carriers ranked as described above in block 1006) for use in the ECID operation. In one implementation, the UE may determine one or more timing advance values associated with one or more radio carriers. A means for determining a first timing advance value and a first carrier identifier associated with the first radio carrier and a means for determining a second timing advance value and a second carrier ID associated with a second radio carrier may include, e.g., the wireless transceiver 710 and one or more processors 702 with dedicated hardware or implementing executable code or software instructions in memory 704 and/or medium 720 such as the timing advance determination module 726. In some implementations, the UE may determine more than one timing advance value (and more than one associated carrier ID). For example, some ECID operations may allow multiple timing advance values. In such cases, the UE may select multiple timing advance values (from radio carriers ranked as described above in block 1006) for use in the ECID operation. A means for determining a second timing advance value and a second carrier ID associated with a second radio carrier may include, e.g., the wireless transceiver 710 and one or more processors 702 with dedicated hardware or implementing executable code or software instructions in memory 704 and/or medium 720 such as the timing advance determination module 726.

At block 1010, the UE transmits a positioning measurement comprising the first timing advance value and the first carrier ID of the first radio carrier. For example, the UE may transmit the timing advance value and the carrier ID to the location server 172. A means for transmitting, to a location server, a positioning measurement comprising the first timing advance value and the first carrier ID of the first radio carrier may include, e.g., the wireless transceiver 710 and one or more processors 702 with dedicated hardware or implementing executable code or software instructions in memory 704 and/or medium 720 such as the communication module 722. In some implementations, the UE may transmit multiple timing advance values and carrier IDs associated with multiple radio carriers to the location server 172. The location server 172 may determine the location of the UE based on the one or more transmitted timing advance values and carrier IDs.

Figure 11:
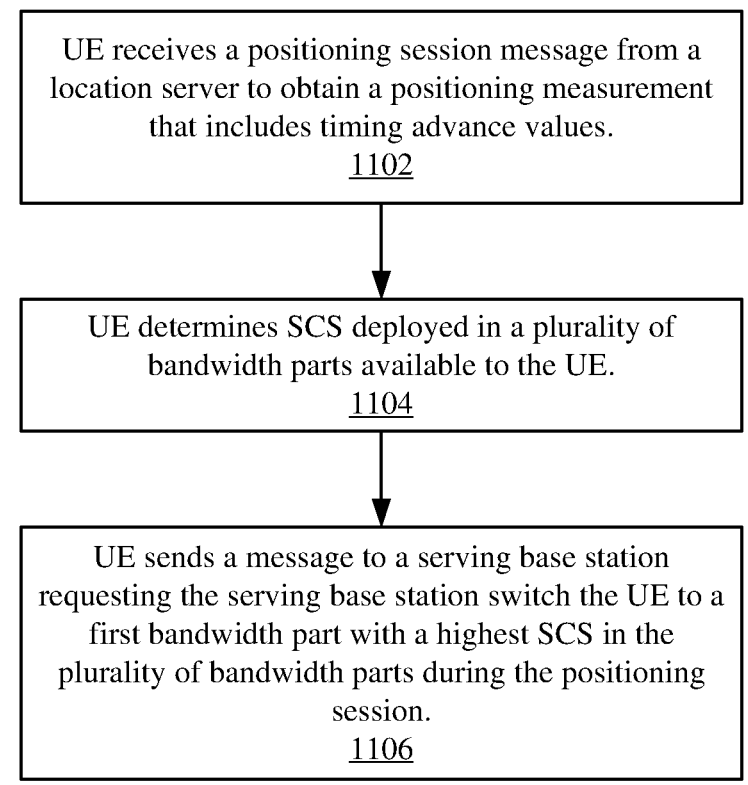
FIG. 11 shows a flowchart for an exemplary method for supporting positioning of a user equipment in a wireless network performed by a user equipment.

FIG. 11 shows a flowchart for an exemplary method 1100 for supporting positioning of a user equipment (UE) in a wireless network performed by a UE, such as such as UE 104 as shown in FIGS. 1, 3, 5 and 6, or the UE 204 in FIGS. 2A and 2B, in a manner consistent with disclosed implementations or by a location server such as the location server 172 as shown in FIGS. 1, 5, and 6 in a manner consistent with disclosed implementations.

At block 1102, a UE receives a positioning session message from a location server to obtain a positioning measurement that includes timing advance values. A means for receiving a positioning session message from a location server to obtain a positioning measurement that includes a timing advance value may include, e.g., the wireless transceiver 710 and one or more processors 702 with dedicated hardware or implementing executable code or software instructions in memory 704 and/or medium 720 such as the communication module 722 in UE 700 shown in FIG. 7.

At block 1104, the UE determines the SCS deployed in a plurality of BWPs available to the UE. That is, the UE may determine the SCS for each available BWP. A means for determining SCS deployed in a plurality of BWPs available to the UE may include, for example, e.g., the wireless transceiver 710 and one or more processors 702 with dedicated hardware or implementing executable code or software instructions in memory 704 and/or medium 720 such as the radio carrier determination module 724. In some implementations, the available BWPs may be ranked or ordered based on SCS, for example from highest SCS to lowest SCS. In this manner, the UE may select the BWPs with the highest SCS. In some other implementations, the UE may communicate with two or more base stations using different radio carriers having different BWPs. The UE may determine the BWPs having the highest SCS from those BWPs associated with the different base stations.

At block 1106, the UE sends a message a serving base station requesting the serving base station to switch the UE to a first BWP with a highest SCS in the plurality of BWPs during the positioning session. In some implementations, the message may be a BWP switch request. A means for sending a message to a serving base station requesting the serving base station to switch the UE to a first bandwidth part with a highest sub-carrier spacing in the plurality of bandwidth parts during a positioning session may include, e.g., the wireless transceiver 710 and one or more processors 702 with dedicated hardware or implementing executable code or software instructions in memory 704 and/or medium 720 such as the communication module 722. In some implementations, the UE may send additional messages to the serving base station to request the serving base station to switch the UE to other BWPs during a positioning session. For example, the UE may request the serving base station switch the UE to a second BWP having a second highest SCS that is lower than a first BWP but higher than remaining BWPs available to the UE. A means for sending a second message to the serving base station requesting the serving base station to switch the UE to a second BWP having a lower SCS than the first BWP and a higher SCS than remaining BWPs in a plurality of BWPs may include, e.g., the wireless transceiver 710 and one or more processors 702 with dedicated hardware or implementing executable code or software instructions in memory 704 and/or medium 720 such as the communication module 722. In some implementations, the UE may receive a second BWP switch request from a serving base station to switch the UE to a second BWP. A means for receiving a second BWP switch request from the serving base station to switch the UE to the second BWP may include, e.g., the wireless transceiver 710 and one or more processors 702 with dedicated hardware or implementing executable code or software instructions in memory 704 and/or medium 720 such as the communication module 722. In some implementations, the UE may determine a second timing advance value associated with the second BWP, wherein the positioning measurement includes the second timing advance value and the first timing advance value ordered based on highest SCS. A means for determining a second timing advance value associated with the second BWP, wherein the positioning measurement includes the second timing advance value and the first timing advance value ordered based on highest SCS may include, e.g., the wireless transceiver 710 and one or more processors 702 with dedicated hardware or implementing executable code or software instructions in memory 704 and/or medium 720 such as the timing advance determination module 726. In some implementations, the UE may send a second message to the serving base station to request the serving base station to switch the UE back to an originally allocated BWP after completing a positioning session. A means for sending a second message to the serving base station requesting the serving base station to switch the UE back to an originally allocated BWP after completion of a positioning session may include, e.g., the wireless transceiver 710 and one or more processors 702 with dedicated hardware or implementing executable code or software instructions in memory 704 and/or medium 720 such as the communication module 722.

In some implementations, the UE may receive a BWP switch request from a serving base station to switch the UE to a BWP. A means for receiving a BWP switch request from a serving base station to switch the UE to a first BWP may include, e.g., the wireless transceiver 710 and one or more processors 702 with dedicated hardware or implementing executable code or software instructions in memory 704 and/or medium 720 such as the communication module 722. In some implementations, the UE may determine a first timing advance value associated with a first BWP. A means for determining a first timing advance value associated with the first BWP may include, e.g., the wireless transceiver 710 and one or more processors 702 with dedicated hardware or implementing executable code or software instructions in memory 704 and/or medium 720 such as the timing advance determination module 726. In some implementations, the UE may transmit, to the location server, a positioning measurement that includes a first timing advance value, wherein a location of the UE is determined based on the first timing advance value. A means for transmitting, to the location server, a positioning measurement that includes the first timing advance value, wherein a location of the UE is determined based on the first timing advance value may include, e.g., the wireless transceiver 710 and one or more processors 702 with dedicated hardware or implementing executable code or software instructions in memory 704 and/or medium 720 such as the communication module 722. In some implementations, the UE may use a previously allocated BWP while waiting to receive a BWP switch request from a serving base station. A means for using a previously allocated BWP while waiting to receive a BWP switch request from a serving base station may include, e.g., the wireless transceiver 710 and one or more processors 702 with dedicated hardware or implementing executable code or software instructions in memory 704 and/or medium 720 such as the timing advance determination module 726.

Figure 12:
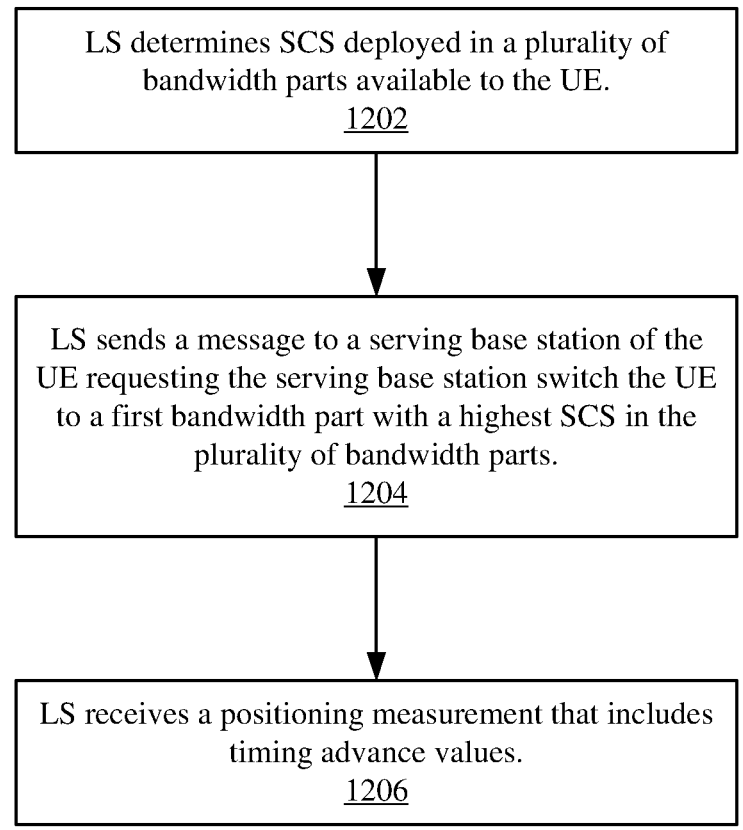
FIG. 12 shows a flowchart for an exemplary method for supporting positioning of a user equipment in a wireless network performed by a user equipment.

FIG. 12 shows a flowchart for an exemplary method 1200 for supporting positioning of a user equipment (UE) in a wireless network performed by a location server, such as such as location server 172 of FIG. 1 in a manner consistent with disclosed implementations.

At block 1202, a location server determines the SCS deployed in a plurality of BWPs available to the UE. That is, the location server may determine the SCS for each available BWP. A means for determining SCS deployed in a plurality of BWPs available to a UE may include, e.g., the communications interface 918 and one or more processors 902 with dedicated hardware or implementing executable code or software instructions in memory 904 and/or medium 920 such as the BWP determination module 926.

In some implementations, the available BWPs may be ranked or ordered based on SCS, for example from highest SCS to lowest SCS. In this manner, the location server may select the BWPs with the highest SCS. In some other implementations, the UE may communicate with two or more base stations using different radio carriers having different BWPs. Thus, the location server may determine the BWPs having the highest SCS from those BWPs associated with the different base stations. A means for determining sub-carrier spacing deployed in a plurality of bandwidth parts available to the UE may include, e.g., the communications interface 918 and one or more processors 902 with dedicated hardware or implementing executable code or software instructions in memory 904 and/or medium 920 such as the BWP determination module 926.

At block 1204, the location server sends a message a serving base station of the UE requesting the serving base station to switch the UE to a first BWP with a highest SCS in the plurality of BWPs during the positioning session. In some implementations, the message may be a BWP switch request. A means for sending a message to a serving base station of the UE requesting the serving base station to switch the UE to a first bandwidth part with a highest SCS in the plurality of BWPs may include, e.g., the communications interface 918 and one or more processors 902 with dedicated hardware or implementing executable code or software instructions in memory 904 and/or medium 920 such as the communication module 922. In some implementations, the location server may send a second message to the serving base station requesting the serving base station switch the UE to a second BWP having a lower SCS than a first BWP and a higher SCS than remaining BWPs in a plurality of BWPs available to a UE. A means for sending a second message to the serving base station requesting the serving base station to switch the UE to a second BWP, the second BWP having a lower SCS than the first BWP and a higher SCS than remaining BWPs in a plurality of BWPs may include, e.g., the communications interface 918 and one or more processors 902 with dedicated hardware or implementing executable code or software instructions in memory 904 and/or medium 920 such as the communication module 922.

At block 1206, the location server receives a positioning measurement that includes a first timing advance value, wherein a location of the UE is determined based on the first timing advance value. A means for receiving a positioning measurement that includes a first timing advance value, wherein a location of the UE is determined based on the first timing advance value may include, e.g., the communications interface 918 and one or more processors 902 with dedicated hardware or implementing executable code or software instructions in memory 904 and/or medium 920 such as the communication module 922 and the location determination module 924. In some implementations, the location server may receive a positioning measurement that includes more than one timing advance value. For example, the location server may receive a positioning measurement that includes a second timing advance value, wherein a location of the UE is determined based on the second timing advance value. A means for receiving a positioning measurement that includes a second timing advance value, wherein a location of the UE is determined based on the second timing advance value may include, e.g., the communications interface 918 and one or more processors 902 with dedicated hardware or implementing executable code or software instructions in memory 904 and/or medium 920 such as the communication module 922.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for supporting positioning of a user equipment (UE) in a wireless network performed by the UE, the method comprising: communicating, by the UE, with one or more base stations using a plurality of radio carriers, each of the plurality of radio carriers being associated with a different base station; receiving an indication to obtain a positioning measurement that includes timing advance information; determining a first radio carrier having a highest sub-carrier spacing in the plurality of radio carriers; determining a first timing advance value and a first carrier identifier (ID) associated with the first radio carrier; and transmitting, to a location server, a positioning measurement comprising the first timing advance value and the first carrier ID of the first radio.
2. The method of clause 1, wherein the first radio carrier is determined to have a higher sub-carrier spacing than all other radio carriers in the plurality of radio carriers.
3. The method of any of clauses 1-2, wherein the first radio carrier is in a group of radio carriers determined to have the highest sub-carrier spacing of the plurality of radio carriers, the method further comprising: determining the first radio carrier has a greatest frequency of updates of timing advance values associated with each radio carrier in the group of radio carriers.
4. The method of any of clauses 1-3, wherein a location of the UE is determined based at least in part on the first timing advance value and the first carrier ID.
5. The method of clause 4, wherein the location of the UE is determined using an Enhanced Cell ID (ECID) positioning technique.
6. The method of any of clauses 1-5, further comprising: selecting a second radio carrier from the plurality of radio carriers based on the sub-carrier spacing of the plurality of radio carriers; and determining a second timing advance value and a second carrier ID associated with a second radio carrier, wherein the second radio carrier has a sub-carrier spacing that is less than the sub-carrier spacing of the first radio carrier, wherein the positioning measurement comprises the second timing advance value and the second carrier ID and the first timing advance value and the first carrier ID ordered based on highest sub-carrier spacing.
7. The method of clause 6, wherein the first and second radio carriers are selected from a group of radio carriers having the highest sub-carrier spacing of the plurality of radio carriers.
8. The method any of clauses 6-7, wherein the first radio carrier is associated with a first base station and the second radio carrier is associated with a second base station, different than the first base station.
9. A user equipment (UE) comprising: a memory; a wireless transceiver configured to communicate through one or more wireless networks; one or more processors operably coupled to the wireless transceiver and the memory, the one or more processors configured to: communicate with one or more base stations using a plurality of radio carriers, each of the plurality of radio carriers being associated with a different base station; receive an indication to obtain a positioning measurement that includes timing advance information; determine a first radio carrier having a highest sub-carrier spacing in the plurality of radio carriers; determine a first timing advance value and a first carrier identifier (ID) associated with the first radio carrier; and transmit, to a location server, a positioning measurement comprising the first timing advance value and the first carrier ID of the first radio carrier.
10. The UE of clause 9, wherein the first radio carrier is determined to have a higher sub-carrier spacing than all other radio carriers in the plurality of radio carriers.
11. The UE of any of clauses 9-10, wherein the first radio carrier is in a group of radio carriers determined to have the highest sub-carrier spacing of the plurality of radio carriers, the one or more processors further configured to: determine the first radio carrier has a greatest frequency of updates of timing advance values associated with each radio carrier in the group of radio carriers.
12. The UE of any of clauses 9-11, wherein a location of the UE is determined based at least in part on the first timing advance value and the first carrier ID.
13. The UE of clause 12, wherein the location of the UE is determined using an Enhanced Cell ID (ECID) positioning technique.
14. The UE of any of clauses 9-13, wherein the one or more processors are further configured to: select a second radio carrier from the plurality of radio carriers based on the sub-carrier spacing of the plurality of radio carriers, and determine a second timing advance value and a second carrier ID associated with a second radio carrier, wherein the second radio carrier has a sub-carrier spacing that is less than the sub-carrier spacing of the first radio carrier, wherein the positioning measurement comprises the second timing advance value and the second carrier ID and the first timing advance value and the first carrier ID ordered based on highest sub-carrier spacing.
15. The UE of clause 14, wherein the first and second radio carriers are selected from a group of radio carriers having the highest sub-carrier spacing of the plurality of radio carriers.
16. The UE of any of clauses 14-15, wherein the first radio carrier is associated with a first base station and the second radio carrier is associated with a second base station, different than the first base station.
17. A user equipment (UE) comprising: means for communicating with one or more base stations using a plurality of radio carriers, each of the plurality of radio carriers being associated with a different base station; means for receiving an indication to obtain a positioning measurement that includes timing advance information; means for determining a first radio carrier having a highest sub-carrier spacing in the plurality of radio carriers; means for determining a first timing advance value and a first carrier identifier (ID) associated with the first radio carrier; and means for transmitting, to a location server, a positioning measurement comprising the first timing advance value and the first carrier ID of the first radio carrier.
18. The UE of clause 17, wherein the first radio carrier is determined to have a higher sub-carrier spacing than all other radio carriers in the plurality of radio carriers.
19. The UE of any of clauses 17-18, wherein the first radio carrier is in a group of radio carriers determined to have the highest sub-carrier spacing of the plurality of radio carriers, the UE further comprising: means for determining the first radio carrier has a greatest frequency of updates of timing advance values associated with each radio carrier in the group of radio carriers.
20. The UE of any of clauses 17-19, wherein a location of the UE is determined based at least in part on the first timing advance value and the first carrier ID.
21. The UE of clause 20, wherein the location of the UE is determined using an Enhanced Cell ID (ECID) positioning technique.
22. The UE of any of clauses 17-21, further comprising: means for selecting a second radio carrier from the plurality of radio carriers based on the sub-carrier spacing of the plurality of radio carriers; and means for determining a second timing advance value and a second carrier ID associated with a second radio carrier, wherein the second radio carrier has a sub-carrier spacing that is less than the sub-carrier spacing of the first radio carrier, wherein the positioning measurement comprises the second timing advance value and the second carrier ID and the first timing advance value and the first carrier ID ordered based on highest sub-carrier spacing.
23. The UE of clause 22, wherein the first and second radio carriers are selected from a group of radio carriers having the highest sub-carrier spacing of the plurality of radio carriers.
24. The UE of any of clauses 21-22 wherein the first radio carrier is associated with a first base station and the second radio carrier is associated with a second base station, different than the first base station.
25. A non-transitory computer readable storage medium including program code stored thereon, the program code is operable to configure at least one processor in a mobile device for supporting positioning of the mobile device in a wireless network, comprising: program code to communicate with one or more base stations using a plurality of radio carriers, each of the plurality of radio carriers being associated with a different base station; program code to receive an indication to obtain a positioning measurement that includes timing advance information; program code to determine a first radio carrier having a highest sub-carrier spacing in the plurality of radio carriers; program code to determine a first timing advance value and a first carrier identifier (ID) associated with the first radio carrier; and program code to transmit, to a location server, a positioning measurement comprising the first timing advance value and the first carrier ID of the first radio carrier.
26. The non-transitory computer readable storage medium of clause 25, wherein the first radio carrier is determined to have a higher sub-carrier spacing than all other radio carriers in the plurality of radio carriers.
27. The non-transitory computer readable storage medium of any of clauses 25-26, wherein the first radio carrier is in a group of radio carriers determined to have the highest sub-carrier spacing of the plurality of radio carriers, the program code further comprising: program code to determine the first radio carrier has a greatest frequency of updates of timing advance values associated with each radio carrier in the group of radio carriers.
28. The non-transitory computer readable storage medium of any of clauses 25-27, wherein a location of the UE is determined based at least in part on the first timing advance value and the first carrier ID.
29. The non-transitory computer readable storage medium of clause 28, wherein the location of the UE is determined using an Enhanced Cell ID (ECID) positioning technique.
30. The non-transitory computer readable storage medium of any of clauses 25-29, wherein the program code further comprises: program code to select a second radio carrier from the plurality of radio carriers based on the sub-carrier spacing of the plurality of radio carriers; and program code to determine a second timing advance value and a second carrier ID associated with a second radio carrier, wherein the second radio carrier has a sub-carrier spacing that is less than the sub-carrier spacing of the first radio carrier, wherein the positioning measurement comprises the second timing advance value and the second carrier ID and the first timing advance value and the first carrier ID ordered based on highest sub-carrier spacing.
31. The non-transitory computer readable storage medium of any of clauses 29-30, wherein the first and second radio carriers are selected from a group of radio carriers having the highest sub-carrier spacing of the plurality of radio carriers.
32. The non-transitory computer readable storage medium of any of clauses 29-31, wherein the first radio carrier is associated with a first base station and the second radio carrier is associated with a second base station, different than the first base station.
33. A method for supporting positioning of a user equipment (UE) in a wireless network performed by the UE, the method comprising: receiving a positioning session message from a location server to obtain a positioning measurement that includes a timing advance value; determining sub-carrier spacing deployed in a plurality of bandwidth parts available to the UE; and sending a message to a serving base station requesting the serving base station to switch the UE to a first bandwidth part with a highest sub-carrier spacing in the plurality of bandwidth parts during a positioning session.
34. The method of clause 33, the method further comprising: receiving a bandwidth part switch request from the serving base station to switch the UE to the first bandwidth part; determining a first timing advance value associated with the first bandwidth part; and transmitting, to the location server, a positioning measurement that includes the first timing advance value, wherein a location of the UE is determined based on the first timing advance value.
35. The method of clause 34, further comprising using a previously allocated bandwidth part while waiting to receive the bandwidth part switch request from the serving base station.
36. The method of any of clauses 34-35, wherein the positioning session message comprises a request to provide assistance data, and wherein sending the message to the serving base station requesting the serving base station to switch the UE to the first bandwidth part is in response to receiving the request to provide assistance data.
37. The method of any of clauses 34-36, wherein the bandwidth part switch request is based on a schedule associated with the positioning session.
38. The method of any of clauses 34-37, wherein the bandwidth part switch request from the serving base station is received in a radio resource control (RRC) configuration message or downlink control indicator (DCI) message.

39. The method of any of clauses 34-38, further comprising sending a second message to the serving base station requesting the serving base station to switch the UE to a second bandwidth part during the positioning session, the second bandwidth part having a lower sub-carrier spacing than the first bandwidth part and a higher sub-carrier spacing than remaining bandwidth parts in the plurality of bandwidth parts; receiving a second bandwidth part switch request from the serving base station to switch the UE to the second bandwidth part; and determining a second timing advance value associated with the second bandwidth part, wherein the positioning measurement includes the second timing advance value and the first timing advance value ordered based on highest sub-carrier spacing.

40. The method of any of clauses 34-39, sending a second message to the serving base station requesting the serving base station to switch the UE back to an originally allocated bandwidth part after completion of the positioning session.

41. A user equipment (UE) comprising: a memory; a wireless transceiver configured to communicate through one or more wireless networks; one or more processors coupled to the wireless transceiver and the memory, the one or more processors configured to: receive a positioning session message from a location server to obtain a timing advance positioning measurement that includes a timing advance value; determine sub-carrier spacing deployed in a plurality of bandwidth parts available to the UE; and send a message to a serving base station requesting the serving base station to switch the UE to a first bandwidth part with a highest sub-carrier spacing in the plurality of bandwidth parts during a positioning session.

42. The UE of clause 41, the one or more processors further configured to: receive a bandwidth part switch request from the serving base station to switch the UE to the first bandwidth part; determine a first timing advance value associated with the first bandwidth part; and transmit, to the location server, a positioning measurement that includes the first timing advance value, wherein a location of the UE is determined based on the first timing advance value.

43. The UE of clause 42, wherein the one or more processors are further configured to: use a previously allocated bandwidth part while waiting to receive the bandwidth part switch request from the serving base station.

44. The UE of any of clauses 42-43, wherein the positioning session message comprises a request to provide assistance data, and wherein the message to the serving base station requesting the serving base station to switch the UE to the first bandwidth part is in response to a reception of the request to provide assistance data.

45. The UE of any of clauses 42-44, wherein the bandwidth part switch request is based on a schedule associated with the positioning session.

46. The UE of any of clauses 42-45, wherein the bandwidth part switch request from the serving base station is received in a radio resource control (RRC) configuration message or downlink control indicator (DCI) message.

47. The UE of any of clauses 42-46, wherein the one or more processors are further configured to: send a second message to the serving base station requesting the serving base station to switch the UE to a second bandwidth part during the positioning session, the second bandwidth part having a lower sub-carrier spacing than the first bandwidth part and a higher sub-carrier spacing than remaining bandwidth parts in the plurality of bandwidth parts; receive a second bandwidth part switch request from the serving base station to switch the UE to the second bandwidth part; and determine a second timing advance value associated with the second bandwidth part, wherein the positioning measurement includes the second timing advance value and the first timing advance value ordered based on highest sub-carrier spacing.

48. The UE of any of clauses 42-47, wherein the one or more processors are further configured to: send a second message to the serving base station requesting the serving base station to switch the UE back to an originally allocated bandwidth part after completion of the positioning session.

49. A user equipment (UE) comprising: means for receiving a positioning session message from a location server to obtain a positioning measurement that includes a timing advance value; means for determining sub-carrier spacing deployed in a plurality of bandwidth parts available to the UE; and means for sending a message to a serving base station requesting the serving base station to switch the UE to a first bandwidth part with a highest sub-carrier spacing in the plurality of bandwidth parts during a positioning session.

50. The UE of clause 49, further comprising: means for receiving a bandwidth part switch request from the serving base station to switch the UE to the first bandwidth part; means for determining a first timing advance value associated with the first bandwidth part; and means for transmitting, to the location server, a positioning measurement that includes the first timing advance value, wherein a location of the UE is determined based on the first timing advance value.

51. The UE of clause 50, further comprising: means for using a previously allocated bandwidth part while waiting to receive the bandwidth part switch request from the serving base station.

52. The UE of any of clauses 50-51, wherein the positioning session message comprises a request to provide timing advance values, and wherein sending the message to the serving base station requesting the serving base station to switch the UE to the first bandwidth part is in response to receiving the request to provide the timing advance values.

53. The UE of any of clauses 50-52, wherein the bandwidth part switch request is based on a schedule associated with the positioning session.

54. The UE of any of clauses 50-53, wherein the bandwidth part switch request from the serving base station is received in a radio resource control (RRC) configuration message or downlink control indicator (DCI) message.

55. The UE of any of clauses 50-54, further comprising: means for sending a second message to the serving base station requesting the serving base station to switch the UE to a second bandwidth part during the positioning session, the second bandwidth part having a lower sub-carrier spacing than the first bandwidth part and a higher sub-carrier spacing than remaining bandwidth parts in the plurality of bandwidth parts; means for receiving a second bandwidth part switch request from the serving base station to switch the UE to the second bandwidth part; and means for determining a second timing advance value associated with the second bandwidth part, wherein the positioning measurement includes the second timing advance value and the first timing advance value ordered based on highest sub-carrier spacing.

56. The UE of any of clauses 50-55, further comprising: means for sending a second message to the serving base station requesting the serving base station to switch the UE back to an originally allocated bandwidth part after completion of the positioning session.

57. A non-transitory computer readable storage medium including program code stored thereon, the program code is operable to configure at least one processor in a mobile device for supporting positioning of the mobile device in a wireless network, comprising: program code to receive a positioning session message from a location server to obtain a positioning measurement that includes a timing advance value; program code to determine sub-carrier spacing deployed in a plurality of bandwidth parts available to the UE; and program code to send a message to a serving base station requesting the serving base station to switch the UE to a first bandwidth part with a highest sub-carrier spacing in the plurality of bandwidth parts during a positioning session.

58. The non-transitory computer readable storage medium of clause 57, the program code further comprising: program code to receive a bandwidth part switch request from the serving base station to switch the UE to the first bandwidth part; program code to determine a first timing advance value associated with the first bandwidth part; and program code to transmit, to the location server, a positioning measurement that includes the first timing advance value, wherein a location of the UE is determined based on the first timing advance value.

59. The non-transitory computer readable storage medium of clause 58, the program code further comprising: program code to use a previously allocated bandwidth part while waiting to receive the bandwidth part switch request from the serving base station.

60. The non-transitory computer readable storage medium of any of clauses 58-59, wherein the positioning session message comprises a request to provide timing advance values, and wherein sending the message to the serving base station requesting the serving base station to switch the UE to the first bandwidth part is in response to receiving the request to provide the timing advance values.

61. The non-transitory computer readable storage medium of any of clauses 58-60, wherein the bandwidth part switch request is based on a schedule associated with the positioning session.

62. The non-transitory computer readable storage medium of any of clauses 58-60, wherein the bandwidth part switch request from the serving base station is received in a radio resource control (RRC) configuration message or downlink control indicator (DCI) message.

63. The non-transitory computer readable storage medium of any of clauses 58-61, further comprising: program code to send a second message to the serving base station requesting the serving base station to switch the UE to a second bandwidth part during the positioning session, the second bandwidth part having a lower sub-carrier spacing than the first bandwidth part and a higher sub-carrier spacing than remaining bandwidth parts in the plurality of bandwidth parts; program code to receive a second bandwidth part switch request from the serving base station to switch the UE to the second bandwidth part; and program code to determine a second timing advance value associated with the second bandwidth part, wherein the positioning measurement includes the second timing advance value and the first timing advance value ordered based on highest sub-carrier spacing.

64. The non-transitory computer readable storage medium of any of clauses 58-63, further comprising: program code to send a second message to the serving base station requesting the serving base station to switch the UE back to an originally allocated bandwidth part after completion of the positioning session.

65. A method for supporting positioning of a user equipment (UE) in a wireless network performed by a location server, the method comprising: determining sub-carrier spacing deployed in a plurality of bandwidth parts available to the UE; sending a message to a serving base station of the UE requesting the serving base station to switch the UE to a first bandwidth part with a highest sub-carrier spacing in the plurality of bandwidth parts; and receiving a positioning measurement that includes a first timing advance value.

66. The method of clause 65, wherein the message to the serving base station of the UE is sent based at least in part on a schedule associated with a positioning session.

67. The method of any of clauses 65-66, further comprising: sending a second message to the serving base station requesting the serving base station to switch the UE to a second bandwidth part, the second bandwidth part having a lower sub-carrier spacing than the first bandwidth part and a higher sub-carrier spacing than remaining bandwidth parts in the plurality of bandwidth parts; and receiving a positioning measurement that includes a second timing advance value, wherein a location of the UE is determined based on the second timing advance value.

68. A location server comprising: a memory; a communication interface configured to communicate through a network; one or more processors coupled to the communication interface and the memory, the one or more processors configured to: determine sub-carrier spacing deployed in a plurality of bandwidth parts available to a user equipment (UE); send a message to a serving base station requesting the serving base station to switch the UE to a first bandwidth part with a highest sub-carrier spacing in the plurality of bandwidth parts; and receive a positioning measurement that includes a first timing advance value, wherein a location of the UE is determined based on the first timing advance value.

69. The location server of clause 68, wherein the message to the serving base station of the UE is sent based at least in part on a schedule associated with a positioning session.

70. The location server of any of clauses 68-69, wherein the one or more processors are further configured to: send a second message to the serving base station requesting the serving base station to switch the UE to a second bandwidth part, the second bandwidth part having a lower sub-carrier spacing than the first bandwidth part and a higher sub-carrier spacing than remaining bandwidth parts in the plurality of bandwidth parts; and receiving a positioning measurement that includes a first timing advance value, wherein a location of the UE is determined based on the first timing advance value.
71. A location server comprising: means for determining sub-carrier spacing deployed in a plurality of bandwidth parts available to a user equipment; means for sending a message to a serving base station requesting the serving base station to switch the UE to a first bandwidth part with a highest sub-carrier spacing in the plurality of bandwidth parts; and means for receiving a positioning measurement that includes a first timing advance value, wherein a location of the UE is determined based on the first timing advance value.
72. The location server of clause 71, wherein the message to the serving base station of the UE is sent based at least in part on a schedule associated with a positioning session.
73. The location server of any of clauses 71-72, further comprising: means for sending a second message to the serving base station requesting the serving base station to switch the UE to a second bandwidth part, the second bandwidth part having a lower sub-carrier spacing than the first bandwidth part and a higher sub-carrier spacing than remaining bandwidth parts in the plurality of bandwidth parts; and means for receiving a positioning measurement that includes a second timing advance value, wherein a location of the UE is determined based on the second timing advance value.
74. A non-transitory computer readable storage medium including program code stored thereon, the program code is operable to configure at least one processor in a location server for supporting positioning of a user equipment (UE) in a wireless network, comprising: program code to determine sub-carrier spacing deployed in a plurality of bandwidth parts available to the UE; program code to send a message to a serving base station of the UE requesting the serving base station to switch the UE to a first bandwidth part with a highest sub-carrier spacing in the plurality of bandwidth parts; and program code to receive a positioning measurement that includes a first timing advance value, wherein a location of the UE is determined based on the first timing advance value.
75. The non-transitory computer readable storage medium of clause 74, wherein the message to the serving base station of the UE is sent based at least in part on a schedule associated with a positioning session.
76. The non-transitory computer readable storage medium of any of clauses 74-75, further comprising: program code to send a second message to the serving base station requesting the serving base station to switch the UE to a second bandwidth part, the second bandwidth part having a lower sub-carrier spacing than the first bandwidth part and a higher sub-carrier spacing than remaining bandwidth parts in the plurality of bandwidth parts; and program code to receive a positioning measurement that includes a second timing advance value, wherein a location of the UE is determined based on the second timing advance value.

Therefore, it is intended that claimed subject matter not be limited to the particular examples disclosed, but that such claimed subject matter may also include all aspects falling within the scope of appended claims, and equivalents thereof.

What is claimed:
1. A method for supporting positioning of a user equipment (UE) in a wireless network performed by the UE, the method comprising:
communicating, by the UE, with one or more base stations using a plurality of radio carriers, each of the plurality of radio carriers being associated with a different base station;
receiving an indication to obtain a positioning measurement that includes timing advance information;
determining that a first radio carrier has a highest sub-carrier spacing among the plurality of radio carriers;
determining a first timing advance value and a first carrier identifier (ID) associated with the first radio carrier;
selecting, based on the first radio carrier having the highest sub-carrier spacing among the plurality of radio carriers, the first timing advance value for use as part of the positioning measurement, wherein the positioning measurement comprises the first timing advance value and the first carrier ID; and
transmitting the positioning measurement to a location server to enable the location server to determine a location of the UE based on the positioning measurement.
2. The method of claim 1, wherein the first radio carrier is determined to have a higher sub-carrier spacing than all other radio carriers in the plurality of radio carriers.
3. The method of claim 1, wherein the first radio carrier is in a group of radio carriers determined to have the highest sub-carrier spacing of the plurality of radio carriers, the method further comprising:
determining the first radio carrier has a greatest frequency of updates of timing advance values associated with each radio carrier in the group of radio carriers.
4. The method of claim 1, wherein the location of the UE is determined based at least in part on the first timing advance value and the first carrier ID.
5. The method of claim 4, wherein the location of the UE is determined using an Enhanced Cell ID (ECID) positioning technique.
6. The method of claim 1, further comprising:
selecting a second radio carrier from the plurality of radio carriers based on the sub-carrier spacing of the plurality of radio carriers; and
determining a second timing advance value and a second carrier ID associated with a second radio carrier, wherein the second radio carrier has a sub-carrier spacing that is less than the sub-carrier spacing of the first radio carrier,
wherein the positioning measurement comprises the second timing advance value and the second carrier ID and the first timing advance value and the first carrier ID ordered based on highest sub-carrier spacing.
7. The method of claim 6, wherein the first and second radio carriers are selected from a group of radio carriers having the highest sub-carrier spacing of the plurality of radio carriers.
8. The method of claim 6, wherein the first radio carrier is associated with a first base station and the second radio carrier is associated with a second base station, different than the first base station.
9. A user equipment (UE) comprising:
a memory;
a wireless transceiver configured to communicate through one or more wireless networks;
one or more processors operably coupled to the wireless transceiver and the memory, the one or more processors configured to:

communicate with one or more base stations using a plurality of radio carriers, each of the plurality of radio carriers being associated with a different base station;
receive an indication to obtain a positioning measurement that includes timing advance information;
determine that a first radio carrier has a highest sub-carrier spacing among the plurality of radio carriers;
determine a first timing advance value and a first carrier identifier (ID) associated with the first radio carrier;
select, based on the first radio carrier having the highest sub-carrier spacing among the plurality of radio carriers, the first timing advance value for use as part of the positioning measurement, wherein the positioning measurement comprises the first timing advance value and the first carrier ID; and
transmit the positioning measurement to a location server, wherein the positioning measurement enables the location server to determine a location of the UE.

10. The UE of claim 9, wherein the first radio carrier is determined to have a higher sub-carrier spacing than all other radio carriers in the plurality of radio carriers.

11. The UE of claim 9, wherein the first radio carrier is in a group of radio carriers determined to have the highest sub-carrier spacing of the plurality of radio carriers, the one or more processors further configured to:
determine the first radio carrier has a greatest frequency of updates of timing advance values associated with each radio carrier in the group of radio carriers.

12. The UE of claim 9, wherein the location of the UE is determined based at least in part on the first timing advance value and the first carrier ID.

13. The UE of claim 12, wherein the location of the UE is determined using an Enhanced Cell ID (ECID) positioning technique.

14. The UE of claim 9, wherein the one or more processors are further configured to:
select a second radio carrier from the plurality of radio carriers based on the sub-carrier spacing of the plurality of radio carriers; and
determine a second timing advance value and a second carrier ID associated with a second radio carrier, wherein the second radio carrier has a sub-carrier spacing that is less than the sub-carrier spacing of the first radio carrier,
wherein the positioning measurement comprises the second timing advance value and the second carrier ID and the first timing advance value and the first carrier ID ordered based on highest sub-carrier spacing.

15. The UE of claim 14, wherein the first and second radio carriers are selected from a group of radio carriers having the highest sub-carrier spacing of the plurality of radio carriers.

16. The UE of claim 14, wherein the first radio carrier is associated with a first base station and the second radio carrier is associated with a second base station, different than the first base station.

17. A user equipment (UE) comprising:
means for communicating with one or more base stations using a plurality of radio carriers, each of the plurality of radio carriers being associated with a different base station;
means for receiving an indication to obtain a positioning measurement that includes timing advance information;
means for determining that a first radio carrier has a highest sub-carrier spacing among the plurality of radio carriers;
means for determining a first timing advance value and a first carrier identifier (ID) associated with the first radio carrier;
means for selecting, based on the first radio carrier having the highest sub-carrier spacing among the plurality of radio carriers, the first timing advance value for use as part of the positioning measurement, wherein the positioning measurement comprises the first timing advance value and the first carrier ID; and
means for transmitting the positioning measurement to a location server to enable the location server to determine a location of the UE based on the positioning measurement.

18. The UE of claim 17, wherein the first radio carrier is determined to have a higher sub-carrier spacing than all other radio carriers in the plurality of radio carriers.

19. The UE of claim 17, wherein the first radio carrier is in a group of radio carriers determined to have the highest sub-carrier spacing of the plurality of radio carriers, the UE further comprising:
means for determining the first radio carrier has a greatest frequency of updates of timing advance values associated with each radio carrier in the group of radio carriers.

20. The UE of claim 17, wherein the location of the UE is determined based at least in part on the first timing advance value and the first carrier ID.

21. The UE of claim 20, wherein the location of the UE is determined using an Enhanced Cell ID (ECID) positioning technique.

22. The UE of claim 17, further comprising:
means for selecting a second radio carrier from the plurality of radio carriers based on the sub-carrier spacing of the plurality of radio carriers; and
means for determining a second timing advance value and a second carrier ID associated with a second radio carrier, wherein the second radio carrier has a sub-carrier spacing that is less than the sub-carrier spacing of the first radio carrier,
wherein the positioning measurement comprises the second timing advance value and the second carrier ID and the first timing advance value and the first carrier ID ordered based on highest sub-carrier spacing.

23. The UE of claim 22, wherein the first and second radio carriers are selected from a group of radio carriers having the highest sub-carrier spacing of the plurality of radio carriers.

24. The UE of claim 22, wherein the first radio carrier is associated with a first base station and the second radio carrier is associated with a second base station, different than the first base station.

25. A non-transitory computer readable storage medium including program code stored thereon, the program code is operable to configure at least one processor in a mobile device for supporting positioning of the mobile device in a wireless network, comprising:
program code to communicate with one or more base stations using a plurality of radio carriers, each of the plurality of radio carriers being associated with a different base station;
program code to receive an indication to obtain a positioning measurement that includes timing advance information;
program code to determine that a first radio carrier has a highest sub-carrier spacing among the plurality of radio carriers;

program code to determine a first timing advance value and a first carrier identifier (ID) associated with the first radio carrier;

program code to select, based on the first radio carrier having the highest sub-carrier spacing among the plurality of radio carriers, the first timing advance value for use as part of the positioning measurement, wherein the positioning measurement comprises the first timing advance value and the first carrier ID; and program code to transmit the positioning measurement to a location server to enable the location server to determine a location of the mobile device based on the positioning measurement.

26. The non-transitory computer readable storage medium of claim 25, wherein the first radio carrier is determined to have a higher sub-carrier spacing than all other radio carriers in the plurality of radio carriers.

27. The non-transitory computer readable storage medium of claim 25, wherein the first radio carrier is in a group of radio carriers determined to have the highest sub-carrier spacing of the plurality of radio carriers, the non-transitory computer readable storage medium further comprising:

program code to determine the first radio carrier has a greatest frequency of updates of timing advance values associated with each radio carrier in the group of radio carriers.

28. The non-transitory computer readable storage medium of claim 25, wherein the location of the mobile device is determined based at least in part on the first timing advance value and the first carrier ID.

29. The non-transitory computer readable storage medium of claim 28, wherein the location of the mobile device is determined using an Enhanced Cell ID (ECID) positioning technique.

30. The non-transitory computer readable storage medium of claim 25, further comprising:

program code to select a second radio carrier from the plurality of radio carriers based on the sub-carrier spacing of the plurality of radio carriers; and program code to determine a second timing advance value and a second carrier ID associated with a second radio carrier, wherein the second radio carrier has a sub-carrier spacing that is less than the sub-carrier spacing of the first radio carrier, wherein the positioning measurement comprises the second timing advance value and the second carrier ID and the first timing advance value and the first carrier ID ordered based on highest sub-carrier spacing.

* * * * *